US009531897B2

(12) United States Patent
Yu

(10) Patent No.: US 9,531,897 B2
(45) Date of Patent: Dec. 27, 2016

(54) SCANNER AND SCANNING METHOD

(71) Applicant: BROTHER KOGYO KABUSHIKI KAISHA, Nagoya-shi, Aichi-ken (JP)

(72) Inventor: Lifan Yu, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/979,701

(22) Filed: Dec. 28, 2015

(65) Prior Publication Data

US 2016/0191734 A1 Jun. 30, 2016

(30) Foreign Application Priority Data

Dec. 26, 2014 (JP) .................................. 2014-264623

(51) Int. Cl.
*H04N 1/00* (2006.01)
*H04N 1/409* (2006.01)
*H04N 1/203* (2006.01)

(52) U.S. Cl.
CPC ...... *H04N 1/00748* (2013.01); *H04N 1/00588* (2013.01); *H04N 1/00602* (2013.01); *H04N 1/00604* (2013.01); *H04N 1/00628* (2013.01); *H04N 1/00718* (2013.01); *H04N 1/00734* (2013.01); *H04N 1/00774* (2013.01); *H04N 1/2032* (2013.01); *H04N 1/4092* (2013.01)

(58) Field of Classification Search
CPC ............ H04N 1/00748; H04N 1/00588; H04N 1/00602; H04N 1/00604; H04N 1/00718; H04N 1/00734; H04N 1/00774; H04N 1/2032; H04N 1/4092
See application file for complete search history.

(56) References Cited

U.S. PATENT DOCUMENTS 5,608,541 A * 3/1997 Yamada ............... H04N 1/3875
358/448
5,708,513 A * 1/1998 Hasuo ...................... H04N 1/04
358/450

FOREIGN PATENT DOCUMENTS

JP 7-283933 A 10/1995
JP 2000-187705 A 7/2000

* cited by examiner

*Primary Examiner* — Quang N Vo
(74) *Attorney, Agent, or Firm* — Merchant & Gould P.C.

(57) ABSTRACT

A scanner is configured to scan an original sheet to generate image data, an image on the original sheet being subject to scanning, obtaining a first side of the original sheet area within one of a leading end side part and a trailing end side part of the image, the first end side part being a part where two edges having a common end do not exist, an outer side edge in the first end side part being obtained as the first side, obtaining a second side of the original sheet area within a second side part, the second end side part being a part where a pair of edges having a common end exists, one of the pair of edges closer to the first end side part being obtained as the second side, and determining the original sheet area based on the first and the second sides.

15 Claims, 12 Drawing Sheets

SCANNER AND SCANNING METHOD

CROSS-REFERENCE TO RELATED APPLICATION

This application claims priority under 35 U.S.C. §119 from Japanese Patent Application No. 2014-264623 filed on Dec. 26, 2014. The entire subject matter of the application is incorporated herein by reference.

BACKGROUND

Technical Field

The present disclosures relate to a scanner configured to scan an image on an original sheet, and a scanning method for such a scanner. The present disclosures particularly relate to generation of image data which is generated when an image on a folded original sheet is scanned using such a scanner and/or according to such a scanning method.

Related Art

Conventionally, there is known a technique to detect edges of an original sheet based on imaged data which is obtained by scanning the original sheet, and extract an image on an original sheet referring to the detected edges of the original sheet. There is also known a technique to compensate for inclination of the original sheet to generate image for output based on the image data representing the scanned image.

SUMMARY

A scanner according to the conventional technique as described above is not intended to scan an image on a folded original sheet. Scanning of the folded original sheet is substantially the same as a situation where two overlapped sheets are scanned. It is noted that the folded sheet may not be folded precisely at the center thereof. Further, even if the sheet is folded precisely at the center thereof, it is difficult to convey such a folded sheet with keeping the folded state. If the original sheet is not folded precisely at the center thereof, when one side surface of the folded sheet is scanned, portions of the other side surface protruded from the one side surface are also scanned. In such a case, it would be difficult to precisely determine an area of the one side surface of the folded original sheet based on the image data obtained by scanning, which lowers extraction accuracy of the image on the original sheet.

According to aspects of the disclosure, there is provided a scanner, which is provided with a scanning device configured to scan an image on an original sheet, and a controller. The controller, when executing instructions, is configured to execute a scanning process in which the controller causes the scanning device to scan an original sheet to generate image data, an image on the original sheet being subject to scanning, an identifying process in which the an original sheet area defining an area of an image of the front surface of the original sheet from an image represented by the image data obtained in the scanning process. The identifying process includes a first side obtaining process in which the controller obtains a first side of the original sheet area within a first end side part which is one of a leading end side part and a trailing end side part of the image, the first end side part being a part where two edges having a common end do not exist, the controller obtaining an outer side edge in the first end side part as the first side, a second side obtaining process in which the controller obtains a second side of the original sheet area within a second side part which is the other of a leading end side part and a trailing end side part of the image, the second end side part being a part where a pair of edges having a common end exists, the controller obtaining one of the pair of edges closer to the first end side part as the second side, and a determining process in which the controller determines the original sheet area based on the first side and the second side. The controller is further configured to execute an extraction process in which the controller extracts an image within the original sheet area from an image represented by the image data obtained in the scanning process.

According to aspects of the disclosures, there is also provided a scanning method employed in a scanner, which method is provided with scanning an original sheet to generate image data, an image on the original sheet being subject to scanning, identifying an original sheet area defining an area of an image of the front surface of the original sheet within an image represented by the image data obtained in the step of scanning. The step of identifying may include obtaining a first side of the original sheet area within a first end side part which is one of a leading end side part and a trailing end side part of the image, the first end side part being a part where two edges having a common end do not exist, an outer side edge in the first end side part being obtained as the first side, obtaining a second side of the original sheet area within a second side part which is the other of a leading end side part and a trailing end side part of the image, the second end side part being a part where a pair of edges having a common end exists, one of the pair of edges closer to the first end side part being obtained as the second side, and determining the original sheet area based on the first side and the second side. The method further includes a step of extracting an image within the original sheet area from an image represented by the image data obtained in the step of scanning.

According to aspects of the disclosures, there is further provided a computer-readable medium for a scanner having a scanning device configured to scan an image on an original sheet and a controller. The computer-readable medium stores instructions which, when executed by the controller, cause the scanner to execute a scanning process in which the controller causes the scanning device to scan an original sheet to generate image data, an image on the original sheet being subject to scanning, an identifying process in which the an original sheet area defining an area of an image of the front surface of the original sheet from an image represented by the image data obtained in the scanning process. The identifying process includes a first side obtaining process in which the controller obtains a first side of the original sheet area within a first end side part which is one of a leading end side part and a trailing end side part of the image, the first end side part being a part where two edges having a common end do not exist, the controller obtaining an outer side edge in the first end side part as the first side, a second side obtaining process in which the controller obtains a second side of the original sheet area within a second side part which is the other of a leading end side part and a trailing end side part of the image, the second end side part being a part where a pair of edges having a common end exists, the controller obtaining one of the pair of edges closer to the first end side part as the second side, and a determining process in which the controller determines the original sheet area based on the first side and the second side. The instructions, when executed by the controller, further cause the scanner to execute an extraction process in which the controller extracts an image within the original sheet area from an image represented by the image data obtained in the scanning process.

BRIEF DESCRIPTION OF THE ACCOMPANYING DRAWINGS

FIG. 1 is a perspective view of a scanner showing an appearance thereof according to an illustrative embodiment of the disclosures.

FIG. 2 schematically shows an inner structure of the scanner according the illustrative embodiment of the disclosures.

Figure 4:
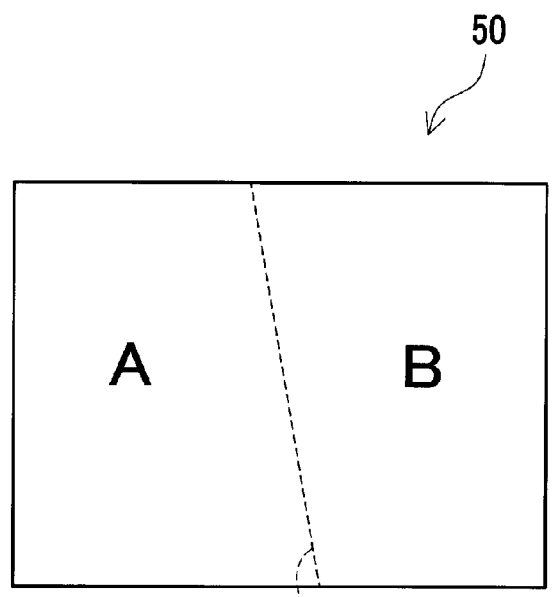
FIG. 4 shows an example of an A3 original sheet which is folded in half at a broken line.
Figures 5A, 5B:
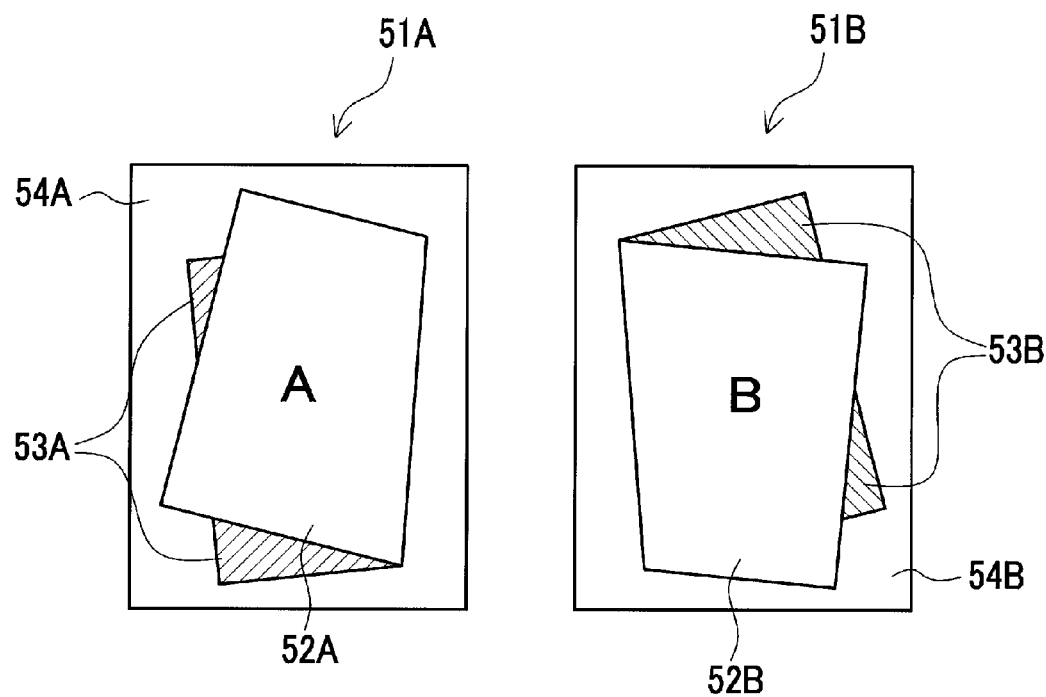

FIGS. 5A and 5B respectively show images obtained by scanning one side and the other side of the folded original sheet which is shown in FIG. 4.

Figure 6:
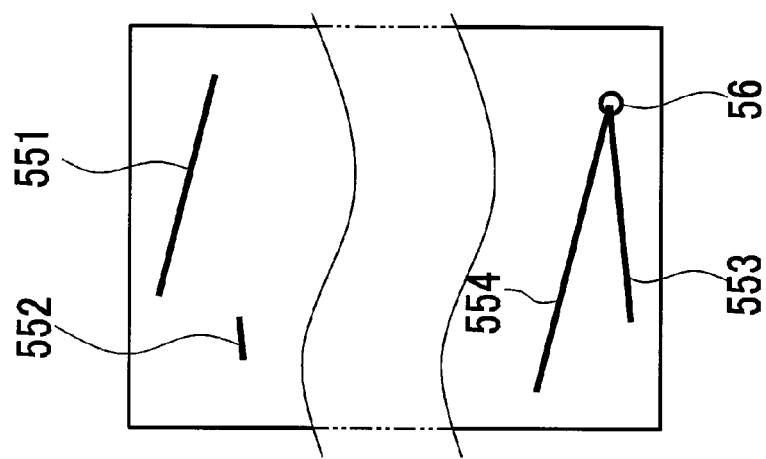

FIG. 6 shows an example of a result of detection of the edges of the folded original sheet.

Figure 7:
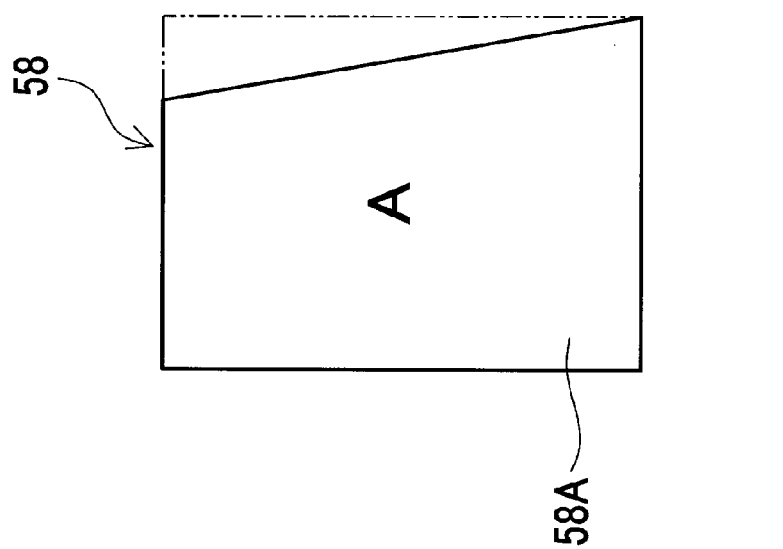

FIG. 7 shows an example of an output image.

Figure 8:
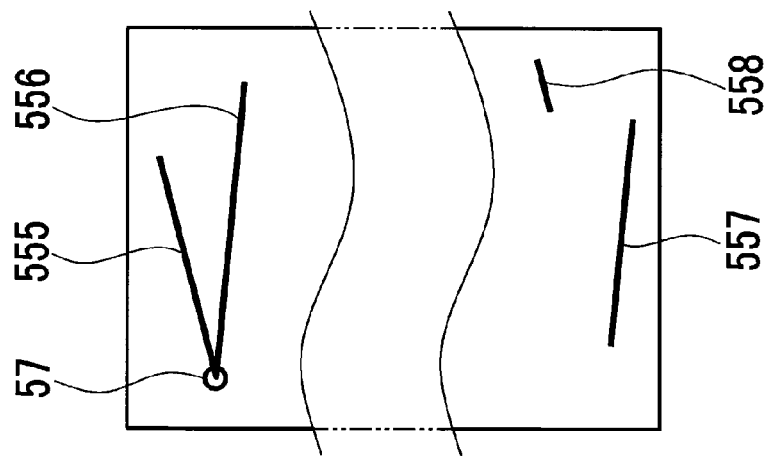

FIG. 8 shows another example of a result of detection of the edges of the folded original sheet.

Figure 9:
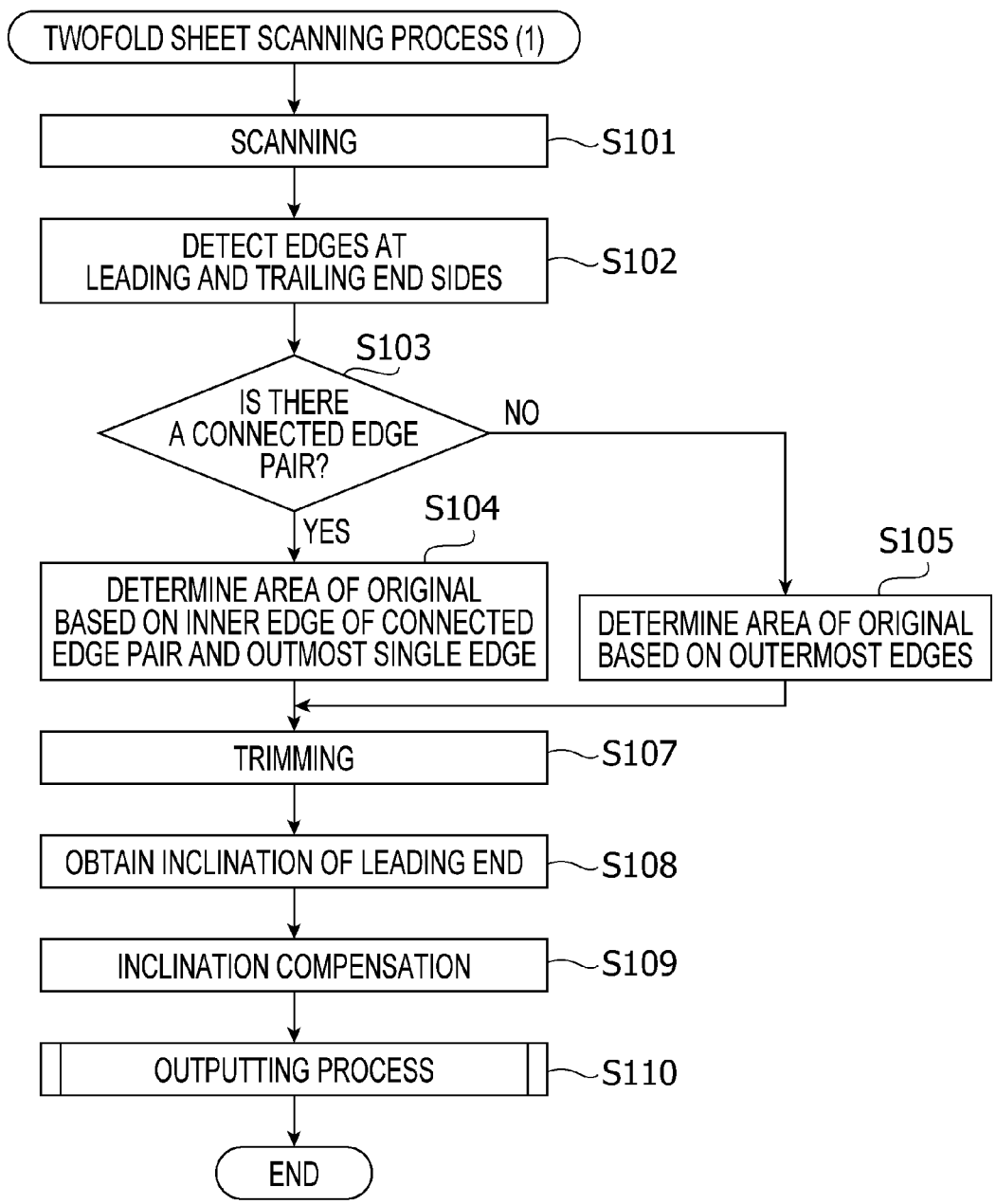

FIG. 9 is a flowchart illustrating a first folded sheet scanning process according to the illustrative embodiment of the disclosures.

Figure 10:
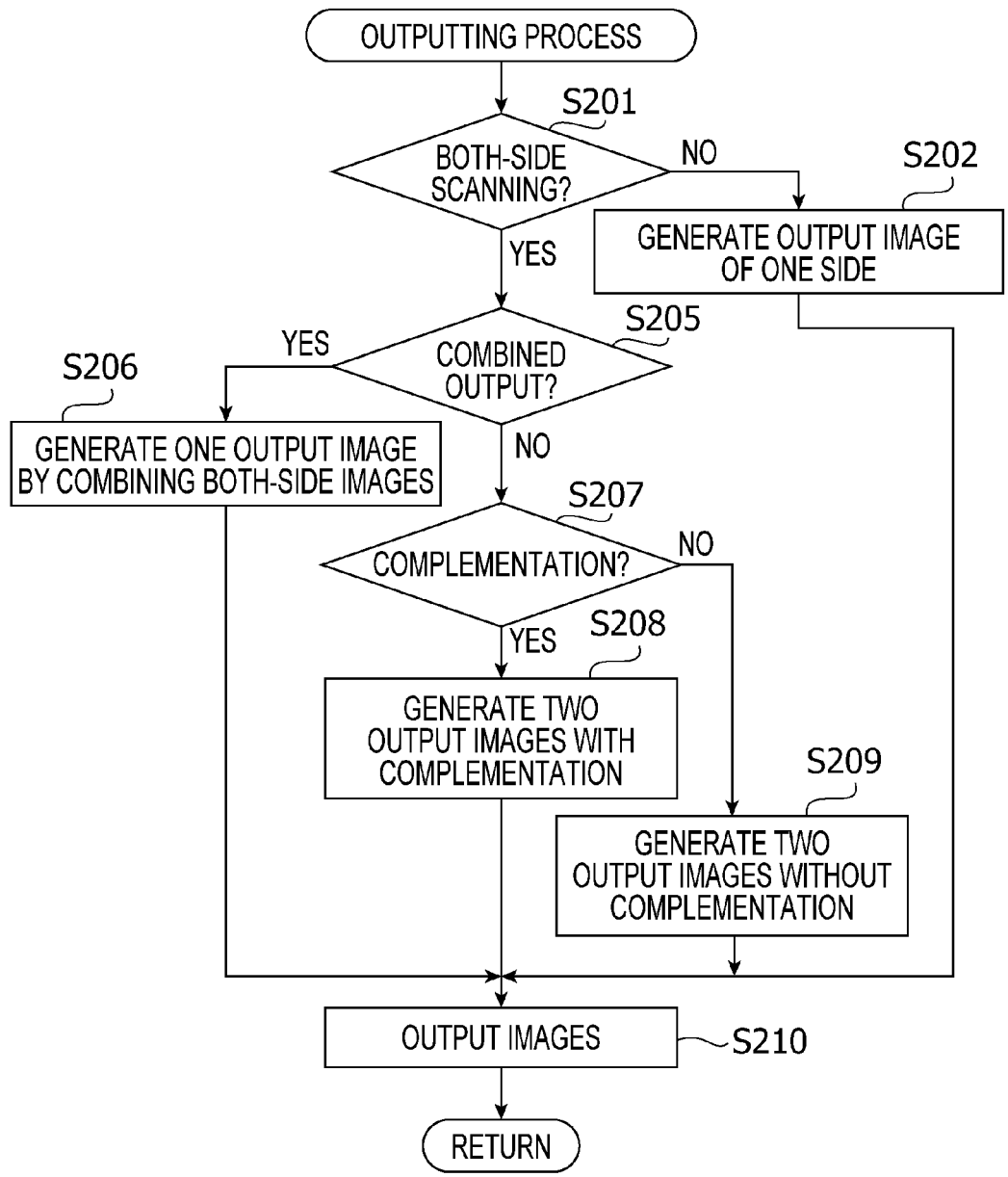

FIG. 10 is a flowchart illustrating an output process according to the illustrative embodiment of the disclosures.

Figure 11:
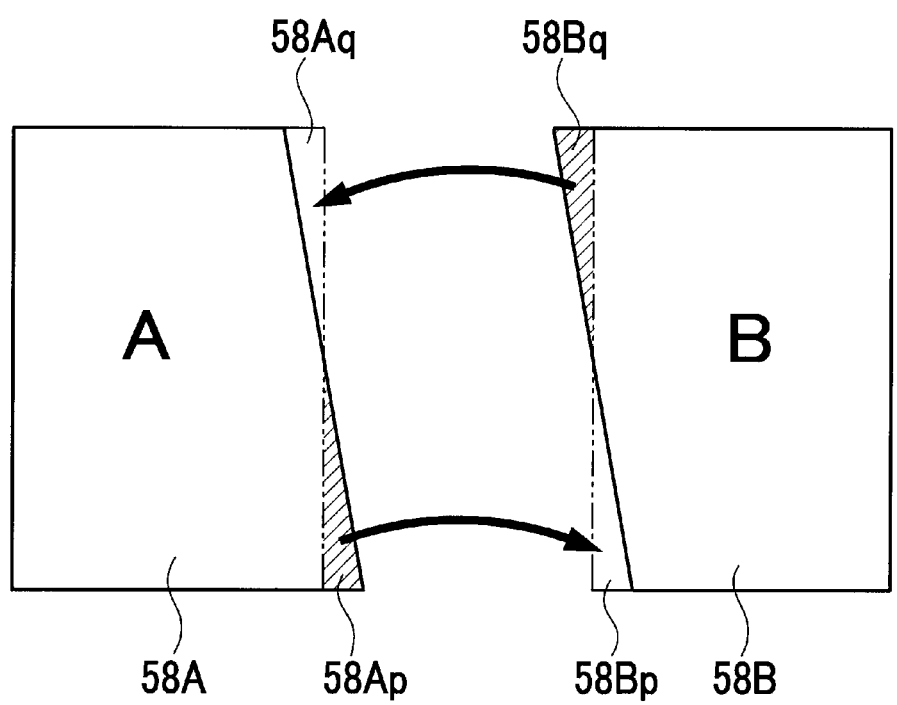

FIG. 11 is a chart illustrating an example of complementation according to the illustrative embodiment of the disclosures.

Figure 12:
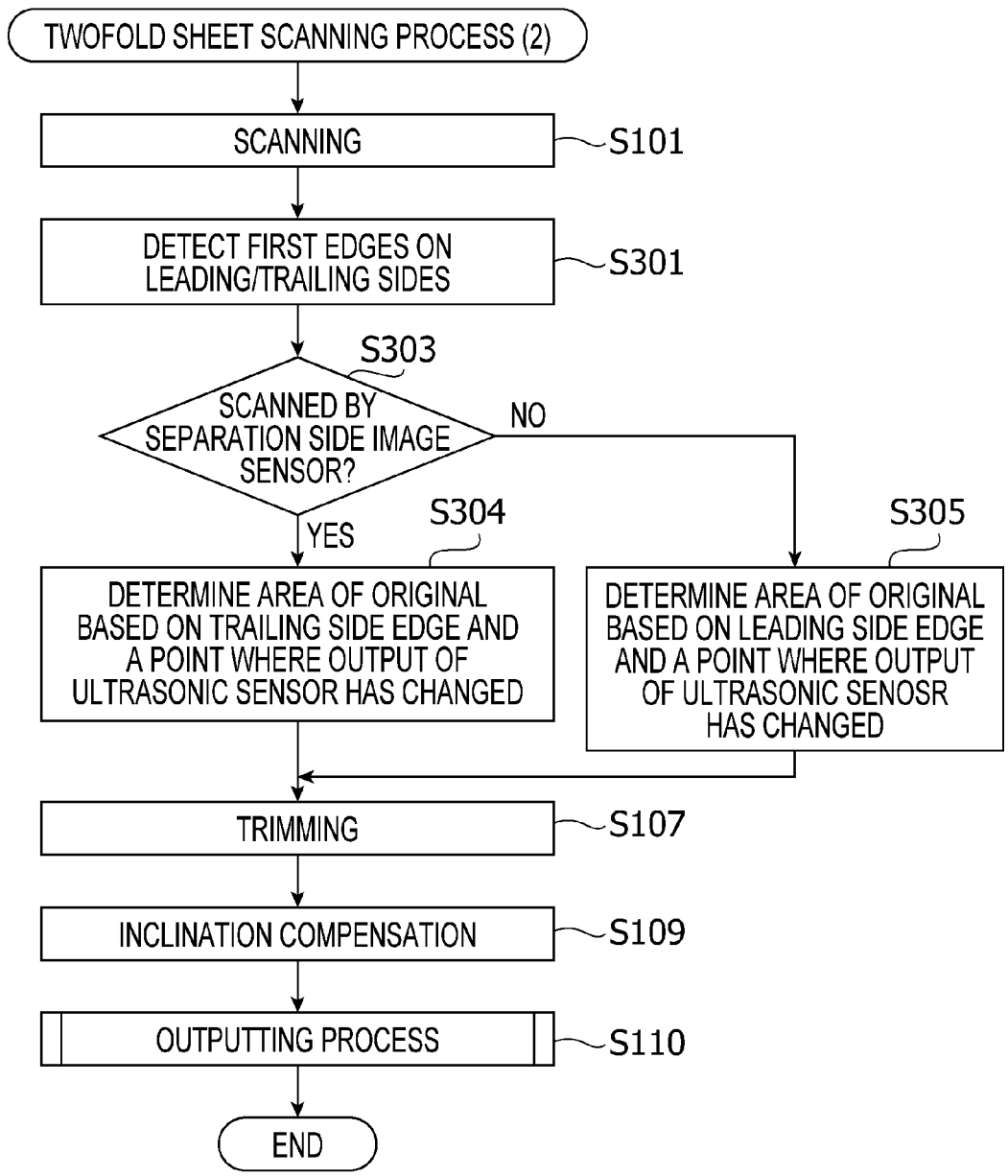

FIG. 12 is a flowchart illustrating a second folded sheet scanning process according to the illustrative embodiment of the disclosures.

Figure 13:
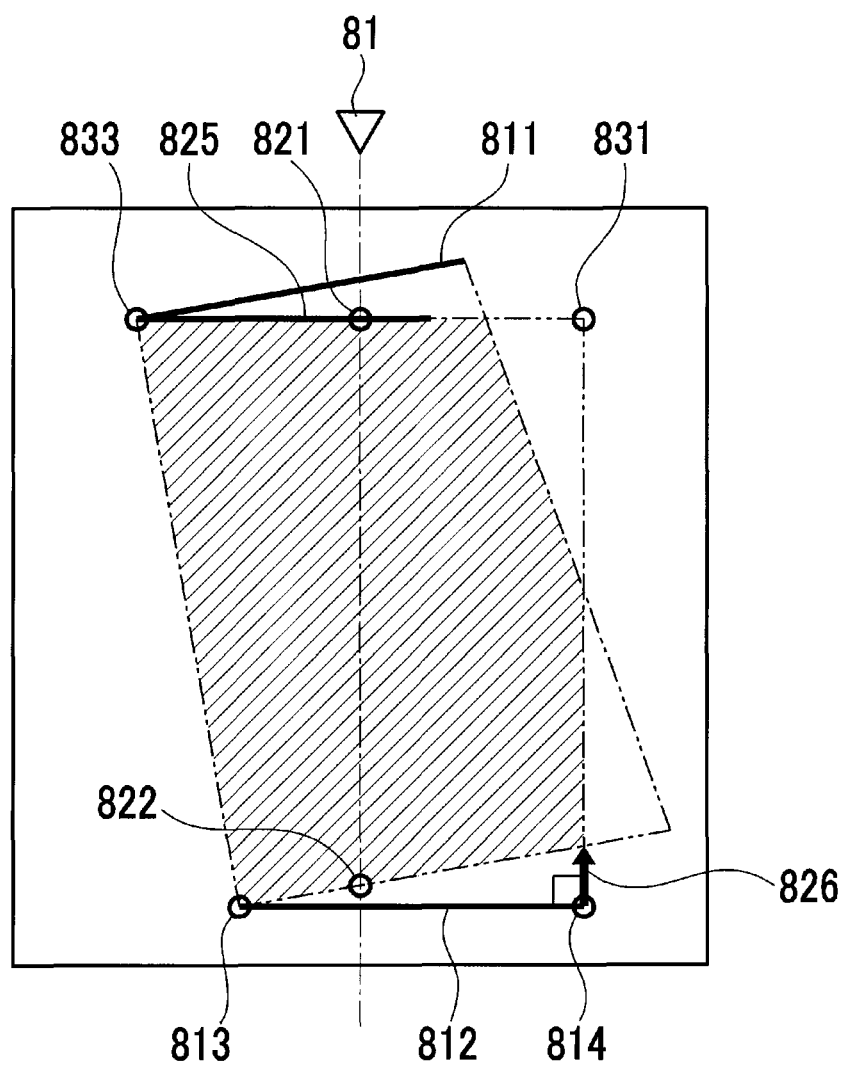

FIG. 13 illustrates an example of a process of determining an area of the original sheet.

Figure 14:
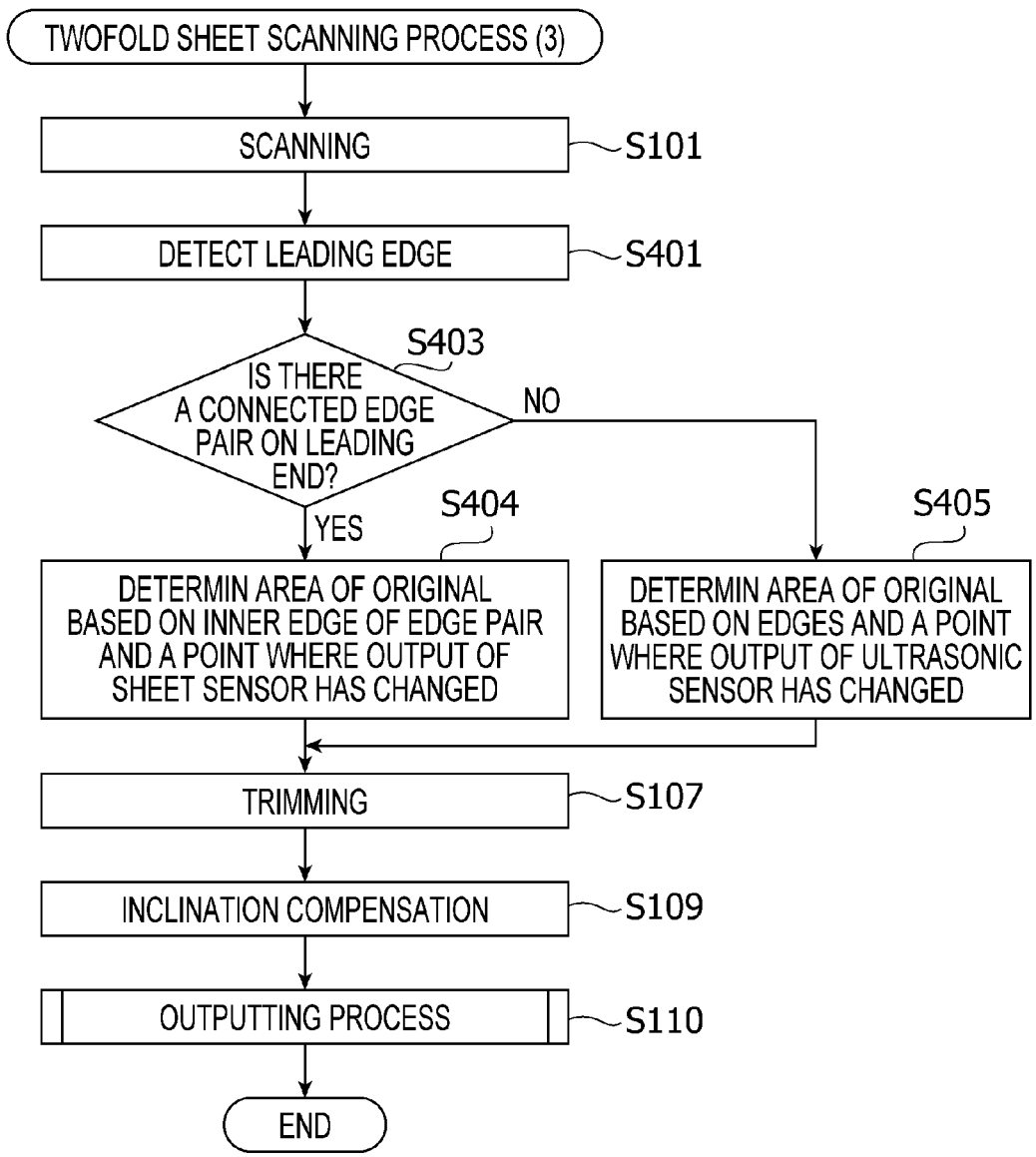

FIG. 14 is a flowchart illustrating a third folded sheet scanning process according to the illustrative embodiment of the disclosures.

Figure 15:
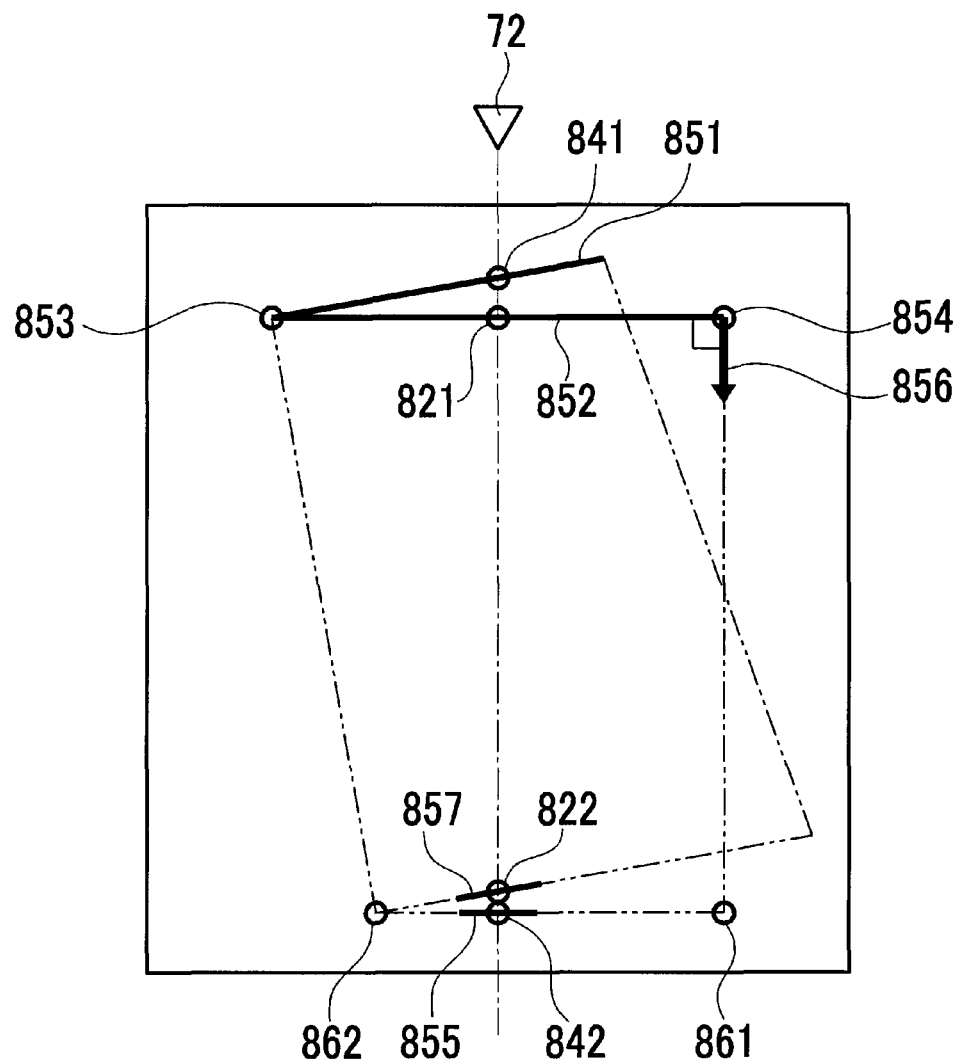

FIG. 15 illustrates an example of a process of determining an area of the original sheet.

DETAILED DESCRIPTION OF ILLUSTRATIVE EMBODIMENTS

Hereinafter, referring to the accompanying drawings, a scanner according to illustrative embodiments will be described.

Figure 1:
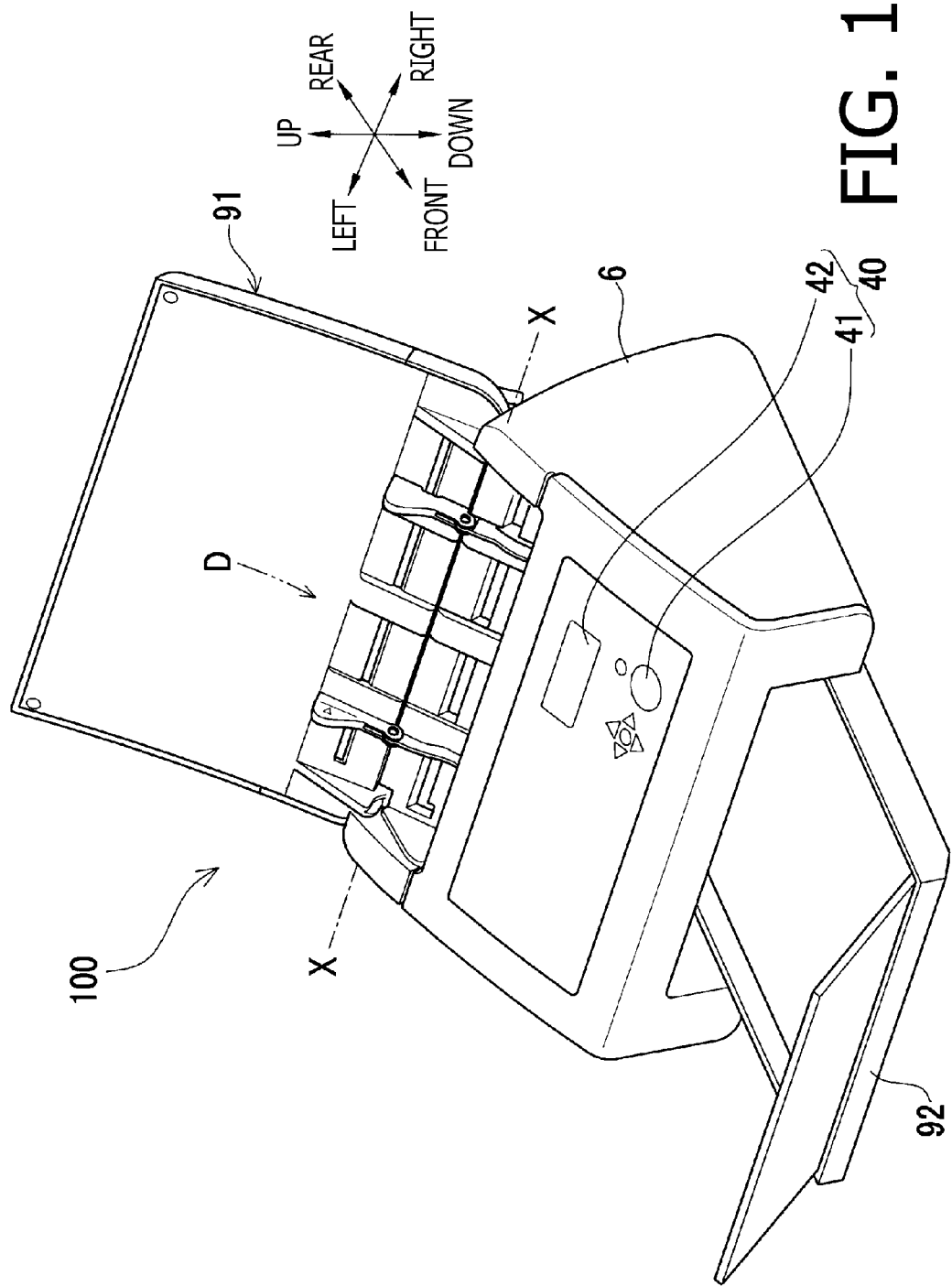

The scanner 100 according to the illustrative embodiment has, as shown in FIG. 1, a housing 6 covering a main body, an original sheet tray 91 and a discharged sheet tray 92. The original sheet tray 91 is rotatable supported by the housing 6 such that the original sheet tray 91 is rotatable about an axis X, which extends in a right-left direction. The discharged sheet tray 92 is arranged at a lower part of the housing 6 and configured to be protruded/inserted with respect to the housing 6 in the front-rear direction. The original sheet tray 91 is an example of an original sheet tray set forth in the claims. It is noted that, as shown in FIG. 1, a side where the discharged sheet tray 92 is arranged is a front side of the scanner 100, a left-hand side of the scanner 100 when viewed from the discharged sheet tray 92 side (i.e., from the front side) is a left side of the scanner 100, the opposite side (i.e., the right-hand side) is referred to as a right side of the scanner 100.

The scanner 100 has an operation panel 40 on an upper surface of the housing 6. The operation panel 40 is provided with a button group including a start key, a stop key, ten keys and the like, and a display 42 including an LCD (liquid crystal display). Using the button group 41 and the display 42, a user of the scanner 100 can see messages and the like displayed on the display 42, and input operation commands.

Figure 2:
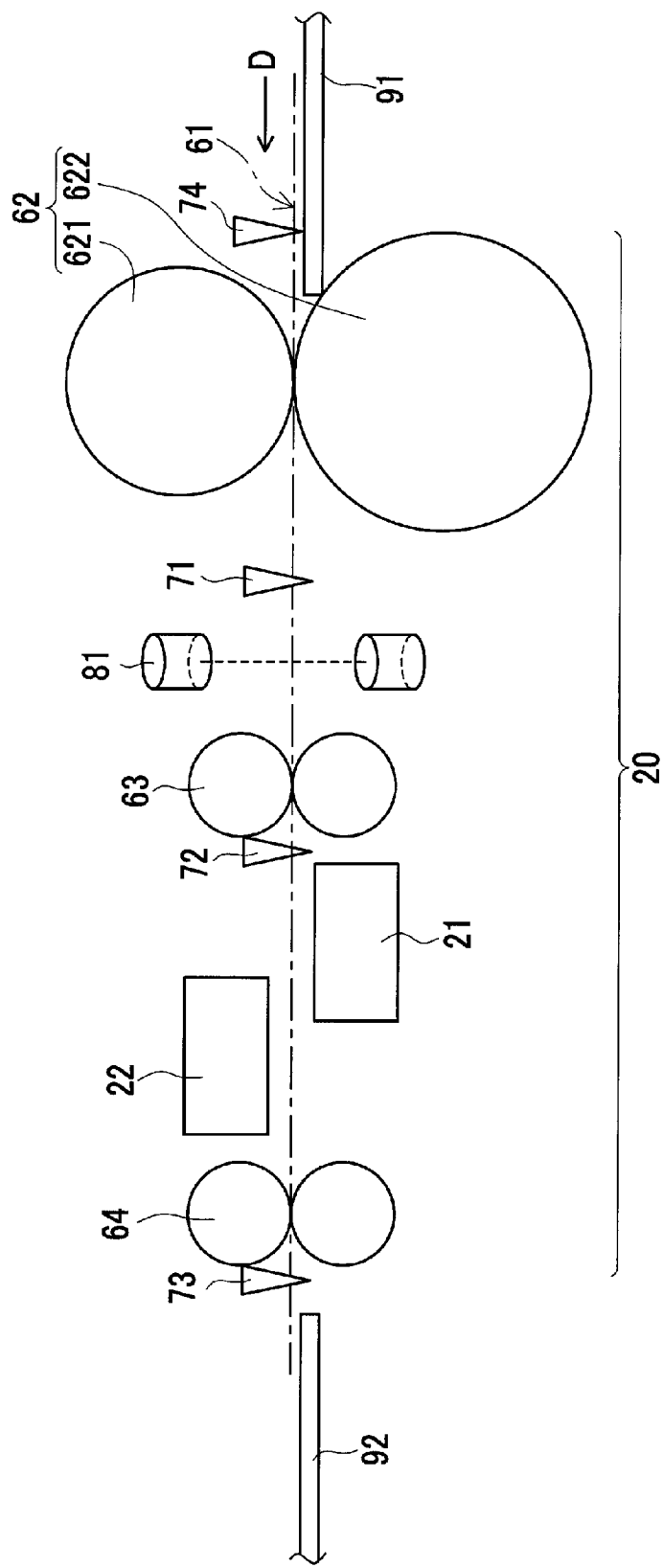

FIG. 2 schematically shows an inner configuration of the scanner 100. Inside the scanner 100, that is, inside the housing 6, a conveying passage 61, which connects the original sheet tray 91 and the discharged sheet tray 92, is defined as a passage through which the original sheet is conveyed. Further, inside the scanner 100, a sheet sensor 74, a separation roller pair 62, a sheet sensor 71, an ultrasonic sensor 81, a first conveying roller pair 63, a sheet sensor 72, image sensors 21 and 22, a second conveying roller pair 64 and a sheet sensor 73 are arranged, along the conveying passage 61, from an upstream to a downstream. In the illustrative embodiment, these components which are used to read the original sheet, are referred collectively as an image reading device 20.

The separation roller pair 62 has rollers 621 and 622. The separation roller pair 62 separates one of the original sheets accommodated in the original sheet tray 91, and feeds the separated original sheet into the housing 6. The separation roller pair 62 is an example of a conveying device set forth in the claims. The scanner 100 rotates the roller 622 in a direction to convey the original sheet inside the housing 6 (i.e., counterclockwise in FIG. 2), thereby the original sheet being conveyed from the original sheet tray 91 to a position inside the housing 6. Further, the scanner rotates the roller 621 in a direction not to introduce the original sheet inside the housing 6 (i.e., counterclockwise in FIG. 2), thereby the original sheets other than one that contacts the roller 622 being remained on the original sheet tray 91. The roller 622 is an example of a feeder, and the roller 621 is an example of a separation device. It is noted that the scanner 100 may have a separation pad instead of the roller 621.

It is noted that the scanner 100 is configured to operate in accordance with an operation mode of the separation roller pair 62. The operation modes of the separation roller pair 62 include a separation mode and a non-separation mode. The scanner 100 receives a user selection of one of the separation mode and the non-separation modes through the operation panel 40. The scanner 100 is also configured to receive a user's command to read a twofold original sheet (i.e., an original sheet folded in half). When the scanner 100 receives the command to scan the twofold original sheet, the operation mode of the separation roller pair 62 is set to the non-separation mode.

When the operation mode of the separation roller pair 62 is the separation mode, the scanner 100 rotates the roller 622 in a direction of conveying the original sheet in the housing 6, and rotates the roller 621 in the same direction as the rotation direction of the roller 622. That is, in the separation mode, the upper roller 621 rotates in a direction of restricting the conveyance of the original sheet inside the housing 6 (i.e., counterclockwise). Therefore, the original sheets are separated reliably. That is, in the separation mode, a possibility of an overlapped feeding of the original sheets (i.e., to feed multiple original sheets) is relatively low.

When the operation mode of the separation roller pair 62 is the non-separation mode, the scanner 100 does not drive the roller 621, but allows the roller 621 to rotate freely. It is noted that the non-separation mode is suitable for scanning a twofold original sheet, an original sheet on which a tag sheet is attached, an original sheet held by a carrier sheet and the like, while, in the non-separation mode, overlapped feeding may occur easily.

The first conveying roller pair 63 has a pair of rollers and conveys the original sheet introduced in the housing 6 by the separation roller pair 62 toward the second conveying roller pair 64. The second conveying roller pair 64 also has a pair of rollers and conveys the original sheet conveyed by the first conveying roller pair 63 toward the discharged sheet tray 92.

The image sensors 21 and 22 are configured to read one and the other surfaces of the original sheet, respectively. Each of the image sensors 21 and 22 is configured such that photoelectric elements are arranged in a depth direction of FIG. 2 (i.e., a direction perpendicular to a plane of FIG. 2), and converts reflected light from the original sheet into an electric signal and outputs the same. As the image sensors 21 and 22, a CIS (contact image sensor) or a CCD (charge coupled device) may be used. According to the illustrative embodiment, the image sensors 21 and 22 can scan images in color, gray scale and monochrome. The image sensors 21 and 22 are examples of a scanning device.

In scanner 100, as shown in FIG. 2, the image sensor 21 is arranged below the conveying passage 61, and the image sensor 22 is arranged above the conveying passage 61. The roller 622 of the separation roller pair 62 is arranged above the conveying passage 61, and the roller 621 of the separation roller pair 62 is arranged below the conveying passage 61. Thus, a lower surface of the original sheet, which contacts the roller 622 and conveyed by the roller 622, is a surface scanned by the image sensor 21, and an upper surface of the original sheet, which surface contacts the roller 621, is a surface scanned by the image sensor 22. The lower surface is an example of a first surface set forth in the claims, while the upper surface is an example of a second surface set forth in the claims.

The scanner 100 is configured to scan image data within an entire area corresponding to the length of the image sensors 21 and 22 in the right-left direction of the scanner 100 regardless of the size of the original sheet subject to be scanned. The scanner 100 obtains the image data subsequently, line by line, in an auxiliary scanning direction as the original sheet is conveyed. At positions opposite to the image sensors 21 and 22 with the conveying passage 61 sandwiched therebetween, white boards are arranged. Accordingly, when there is no original sheet at scanning positions of the image sensors 21 and 22, the image sensors 21 and 22 scan the white boards, respectively.

Each of the sheet sensors 71, 72 and 73 are photosensitive elements respectively provided with movable members. The sheet sensors 71, 72 and 73 are configured to output signals representing presence/absence of the original sheet at respective detection positions. Each of the sheet sensors 71, 72 and 73 is configured such that the movable member thereof is protruded in the conveying passage 61 (i.e., the movable member is located at a reference position) when no original sheet is located at the detection position, while the movable member is displaced from the reference position and located at a position other than the reference position when the original sheet is present at the detection position as the portion is pushed by the original sheet. As the original sheet is further conveyed and becomes absent at the detection position, the movable member of the sheet sensor 71 (72, 73) returns to its reference position by its own weight or urging force.

Each of the sheet sensors 71, 72 and 73 has a light emitting element and a light receiving element, and is configured such that, when the movable member is not located at the reference position, light emitted by the light emitting element is blocked by the movable member and is not received by the light receiving element, while when the movable member is located at the reference position, light emitted by the light emitting element is not blocked by the movable member and is received by the light receiving element.

The sheet sensor 74 is a photo sensor that is not provided with a movable member, and is configured to output signals indicating presence/absence of the original sheet depending on whether the original sheet is present/absent on the original sheet tray 91. For example, the sheet sensor 74 may have a light emitting element and a light receiving element, and may be configured such that light emitted by the light emitting element to the original sheet placed on the original sheet tray 91 through a through hole formed on the original sheet tray 91, and received the reflected light with use of the light receiving element. Based on the intensity of received light or based on whether the reflected light is received or not, presence/absence of the original sheet on the original sheet tray 91 may be determined.

The sheet sensors 71, 72 and 73 are used to determine presence/absence of the original sheet at different detection positions on the conveying passage 61, respectively. Further, the sheet sensor 74 is used to determine presence/absence of the original sheet at its detection position. According to the illustrative embodiment, the detection positions of the sheet sensors 71 and 72 are on the downstream side, in the sheet conveying direction, with respect to the separation roller pair 62 and on the upstream side with respect to the image sensors 21 and 22. The sheet sensors 71 and 72 are examples of the sheet sensor set forth in the claims.

The scanner 100 is capable of determining presence/absence of the original sheet on the original sheet tray 91 based on the output of the sheet sensor 74. Further, the scanner 100 is capable of determining whether the original sheet has been successfully loaded into the scanner 100 based on the output of the sheet sensor 71. Still further, the scanner 100 is capable of controlling a timing of start of scanning with use of the image sensors 21 and 22 based on the output of the sheet sensor 72. Furthermore, the scanner 100 is capable of determining whether the original sheet having been scanned is discharged onto the discharged sheet tray 92 based on the output of the sheet sensor 73.

The ultrasonic sensor 81 is a transmission type sensor having a transmitter and a receiver. Based on the thickness of the original sheet passing a position between the transmitter and the receiver, the ultrasonic sensor 81 outputs different signals. When an overlapped feeding occurs (i.e., multiple sheets are conveyed with overlapped), the ultrasonic wave the receiver receives is attenuated in comparison with a case where a single sheet is conveyed. According to the illustrative embodiment, based on the output of the sheet sensor 71, the transmitter of the ultrasonic sensor 81 is caused to emit the ultrasonic wave at a timing when the original sheet reaches the detection position, and causes the receiver of the ultrasonic sensor 81 to receive the ultrasonic wave.

As described above, the ultrasonic sensor 81 outputs different signals depending on whether a single original sheet is being conveyed or multiple original sheets are conveyed in an overlapped state. Based on the output of the ultrasonic sensor 81, the scanner 100 determines whether the overlap feeding is occurring or not. It is noted that the ultrasonic sensor 81 is an example of a overlapped feeding sensor set forth in the claims.

In the scanner 100, when the original sheet on which a tag or a sticker is attached or a folded original sheet is conveyed, it would likely be detected that the overlapped feeding occurs. Since the overlapped feeding would cause a jam, if occurrence of the overlapped feeding is detected when a scanning of a twofold original sheet is not instructed, the scanner 100 determines that an error occurs and stops conveying the original sheet. When the scanning of the twofold original sheet has been instructed, the scanner 100 does not use the output of the ultrasonic sensor 81 for detecting an error of overlapped feeding. It is noted that the detection of the overlapped feeding based on the output of the ultrasonic sensor 81 can be invalidated. For this purpose, the scanner 100 is configured to acquire a user input to invalidating (or, ignoring) detection of the overlapped feeding) through the operation panel 40.

The original sheets placed on the original sheet tray 91 are conveyed from the original sheet tray 91 toward the discharged sheet tray 92 in the direction indicated by arrow D shown in FIGS. 1 and 2. That is, when the scanning is to be executed, the user places the original sheets on the original sheet tray 91. The original sheets placed on the original sheet tray 91 is conveyed toward downstream side of the conveying passage 61 one by one by the separation roller pair 62. The original sheet conveyed through the conveying passage 61 is scanned by the image sensor 21 and/or image sensor 22. Then, the original sheet having been scanned is discharged from the scanner 100 and stacked on the discharged sheet tray 92.

The scanner 100 determines an area of the image of the original sheet based on the image represented by the image data which is generated by scanning the original sheet, and extracts the image within the determined area, and generates an image file such as a JPEG file based on the extracted image. Then, the thus generated image file is stored in a storage designated by the user or transmitted to a destination designated by the user.

Figure 3:
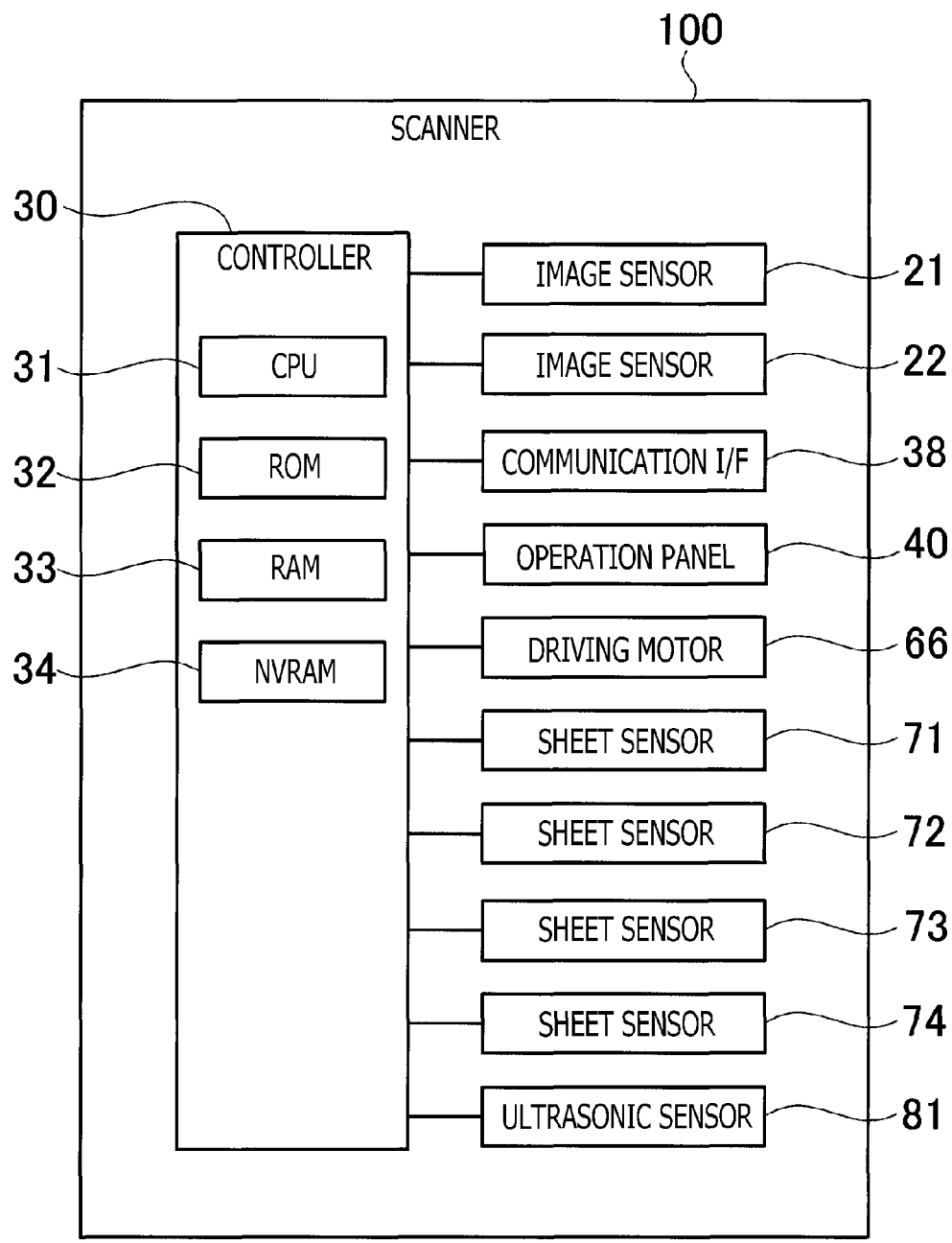
FIG. 3 is a block diagram illustrating an electrical configuration of the scanner according to the illustrative embodiment of the disclosures.

Next, an electrical configuration of the scanner according to the illustrative embodiment will be described. As shown in FIG. 3, the scanner 100 has a controller 30 including a CPU (central processing unit) 31, a ROM (read only memory) 32, a RAM (random access memory) 33 and an NVRAM (non-volatile RAM) 34. It is noted that the term "controller" is a collective term intended to cover hardware including the CPU 31 and the like, but does not necessary mean a single unit of hardware inside the scanner 100.

The scanner 100 further includes the image sensors 21 and 22, a communication interface (I/F) 38, the operation panel 40, a driving motor 66, the sheet sensors 71, 72, 73 and 74, and the ultrasonic sensor 81, which are controlled by the CPU 31. It is noted that the driving motor 66 serves as a driving source for the separation roller pair 62, the first conveying roller pair 63, and the second conveying roller pair 64.

The ROM 32 stores firmware which is a control program to control the scanner 100, various setting values and initial values. The RAM 33 is used as a work area which is used when control programs are executed and/or is used as an area for temporarily storing image data and the like. The CPU 31 controls respective components of the scanner 100 by executing control programs retrieved from the storage in accordance with the signals transmitted from the sensors, storing operation results in the RAM 33 or the NVRAM 34.

It is noted that the CPU 31 is an example of a controller. Alternatively, the controller 30 is the controller set forth in the claims.

The communication I/F 38 is hardware enabling a communication with external devices such as a personal computer (PC) and the like. Concrete examples of such a communication I/F 38 are, a wired LAN (local area network) interface, a wireless LAN interface, a serial communication interface. The scanner 100 is capable of transmitting image data to the PC or the like through the communication I/F 38. It is noted that the external device with which the scanner 100 can connect through the communication I/F 38 is not limited to the PC, but the external devices may include a smartphone, a server, a flash memory and the like.

Next, a twofold original sheet scanning process to read an image on a twofold original sheet will be described in detail, referring to the accompanying drawings. The scanner 100 starts scanning the twofold original sheet when the scanner 100 receives a twofold original sheet scanning command as an execution command. When the scanner 100 receives the twofold original sheet scanning command, as mentioned above, the scanner 100 sets the operation mode of the separation roller pair 62 to the non-separation mode. Further, the scanner 100 operates such that the output of the ultrasonic sensor 81 is not used for the overlapped feeding error detection, and the scanner 100 keeps conveying the original sheet even through the overlapped feeding state occurs, and scans the original sheet.

A scannable area of the scanner 100 in a right-left direction in FIG. 1 is determined depending on the length of the image sensors 21 and 22 in the right-left direction. For example, when the scannable area is slightly longer than a shorter side of an A4 size (i.e., 210 mm×297 mm) sheet, and shorter than a longer side of the A4 size sheet, a width of the original sheet tray 91, a width of the conveying passage 61 in a direction perpendicular to the sheet conveying direction are also slightly longer than the shorter side of the A4 size sheet, and shorter than the longer side of the A4 size sheet. In such a case, when the original sheet is of the A4 size, the scanner 100 can scan the original sheet even if it is slightly inclined with respect to the conveying direction. When the original sheet is of an A3 size (297 mm×420 mm), the scanner 100 cannot scan such an original sheet when it is unfolded. However, when the original sheet is a twofold A3 size sheet, the scanner 100 can convey and scan such an original sheet.

There are two operations to scan the twofold original sheet. One is a both-side twofold sheet scanning operation in which both the image sensors 21 and 22 are used to scan the twofold original sheet from both sides. The other is a one-side twofold sheet scanning operation in which only one of the image sensors 21 and 22 is used to scan the twofold original sheet from only one side (i.e., a half portion of the original sheet is scanned). According to the both-side twofold sheet scanning operation, the scanner 100 is capable of combining two images of both sides of the twofold original sheet to generate one image including an entire image of the original sheet and outputting the combined one image, or simply outputting two images respectively scanned with the image sensors 21 and 22, in accordance with a user's command. According to the one-side twofold sheet scanning operation, the scanner 100 scans only a half portion of the original image and output a one scanned image.

Next, a case where the scanner 100 executes the both-side twofold sheet scanning operation, in accordance with the execution command input by the user, to scan a twofold original sheet, which is an A3 size original sheet 50 as shown in FIG. 4 and is folded in half at a broken line, will be described.

When the user has folded the original sheet 50 precisely at the center thereof, and the original sheet 50 is conveyed with the twofold state being maintained, two A4 size images for respective sides of the twofold original sheet can be obtained. When the scanner 100 has received a command to output a combined image, the scanner 100 arranges the two A4 size images side by side and combine the same to form a single A3 size image, which is output by the scanner 100.

It is noted that the twofold original sheet may not be folded at the center thereof precisely. That is, the user may fold the original sheet at a line which is slightly shifted from the center line of the unfolded original sheet. Further, even if the sheet is folded at the center thereof, the state of the folded sheet may not be maintained during its conveyance. For example, the separation roller pair 62 has the rollers 61 and 62 and configured to separate the conveyed original sheet from the other original sheets. For this purpose, the surfaces of the rollers 61 and 62 have different materials and different surface conditions, and a friction force between the roller 61 and the original sheet is different from a frictional force between the roller 62 and the original sheet.

When the twofold original sheet which is not accurately folded at the center, depending on a position of the fold, an image scanned from one side of the twofold original sheet may include a portion of a surface which is not subject to scanning outside the image of the portion subject to scanning. For example, when the original sheet 50 is folded at the line 501 indicated by broken line in FIG. 4, first image data 51A and second image data 51B shown in FIGS. 5A and 5B are obtained with use of the image sensors 21 and 22, respectively.

The first image data 51A includes the image 52A which is a portion of the front surface of the original sheet, images 53A which is an image of portions of the reverse surface of the original sheet and protruded with respect to the image 52A, and a white board image 54A surrounding the image 52A and the images 53A (see FIG. 5A). The second image data 51B includes the image 52B which is a portion of the front surface of the original sheet subject to scanning, images 53B which is an image of portions of the reverse surface of the original sheet and protruded with respect to the image 52B, and a white board image 54B surrounding the image 52B and the images 53B (see FIG. 5B).

It is noted that the white board images 54A and 54B are images of areas where the original sheet does not exist, and thus, the images obtained by scanning the white board mentioned above. In FIGS. 5A and 5B, areas represented by the first image data 51A and the second image data 51B are indicated as rectangles drawn by solid lines. The images 53A and 53B of the reverse surface portions of the original sheet are indicated with oblique hatching in FIGS. 5A and 5B.

In the drawings which show images or edges, a direction along which the scanning is performed corresponds to the up-down direction of respective drawings. Specifically, an image is arranged in each drawing such that a leading end portion, which is scanned earlier, is an upper side, and a trailing end portion, which is scanned later, is a down side. In other words, in each drawing, the upper portion is a portion scanned earlier, and the lower portion is a portion scanned later. Thus, in the following description, the up and down portions are also referred to as earlier scanned portion and later scanned portion, and a right-left direction is also referred to as a sensor array direction. It is noted that the scanner 100 obtains image data line by line, which extends in the right-left direction, and multiple lines of image data are obtained from the leading end to the trailing end.

After the images of both sides of the twofold original sheet are scanned, the scanner 100 detects edges of the leading end side part and trailing end side part of the image, from each of the first image data 51A and the second image data 51B. The edge is a position at which a data value of the image data changes relatively largely to exceed a particular threshold value. The data value represents amplitude of a brightness component, or one of RGB (red, green and blue) components. Thus, for example, the scanner 100 refers to a distribution of brightness and compares brightness values with the particular threshold value, and determines a position (points) at which the brightness values change largely to exceed the particular threshold value as the edges.

The scanner 100 checks the image data from the leading end toward the trailing end, in the top-bottom direction (corresponding to the sheet conveying direction) to detect a point at which a change of the data value exceeds the particular threshold value. The scanner 100 assumes that such a point is the edge point. By detecting such a point, the scanner 100 obtains positions of multiple edge points on the leading end side part. Similarly, the scanner 100 checks the image data from the trailing end toward the leading end, in the top-bottom direction, and obtains multiple edge points on the trailing end side part. Then, the scanner 100 executes linear approximation based on the thus obtained multiple edge points to obtain linear edges.

After detecting a first edge in accordance with the detection executed from the leading end or trailing end in the top-bottom direction, the scanner 100 keeps detecting an edge along the same direction. When a second edge is detected or detection of a particular area has been finished, the scanner 100 terminates the edge detection.

Further, the scanner 100 checks the image data along the detected edge, substantially along the sensor array direction, to detect a position of an end of the edge at which a row of the edge points come to an end. When two or more edges are detected on at least one of the leading end side part and the trailing end side part, the scanner 100 determines whether the positions of the ends of the two edges are located at the same position, based on the end positions obtained for respective edges.

With such a process, the scanner 100 detects, for example, multiple edges as shown in FIG. 6 in the first image data 51A shown in FIG. 5A. That is, the scanner 100 detects edges 551 and 552 on the leading end side part, and edges 553 and 554 on the trailing end side part. Further, the scanner 100 obtains positions of both ends of each of the edges 551, 552, 553 and 554. In this example shown in FIG. 6, one end of the trailing end side edge 553 and one end of the trailing end side edge 554 have a common edge 56. That is, on the trailing end side of the first image data 51A, there are two edges of which one ends are common.

In the following description, a combination of two edges of which one ends are common (e.g., the edges 553 and 554) will be referred to as a connected edge pair. It is noted that, when a part of a second edge of a connected edge pair is assumed to be out of a detection area, the scanner 100 may enhance the detection area and continue the detection of the edges.

Next, based on the detected multiple edges, the scanner 100 determines an area, within the image, of the original sheet which is an area of an image on the surface subject to be read of the original sheet. The scanner 100 selects edges corresponding to one side and an opposite side of the area of the original sheet from among the multiple edges as detected. Further, the scanner 100 determines an image within a rectangular area which is defined by connecting both ends of the selected one and opposite sides as an area e of the original sheet. According to the illustrative embodiment, it is assumed that the original sheet is rectangular, and the area of the original sheet of the twofold original sheet has a trapezoidal shape of which at least two interior angles are right angles. It should be appreciated that, throughout the specification, the term the "right angle" could include some errors and may be interpreted as "substantially" the "right angle" and should not necessarily be interpreted as the accurate right angle.

For this purpose, on the side part (i.e., the leading end side part or the trailing end side part) where the connected edge pair was not detected, the scanner 100 obtains an outer edge in the up-down direction in FIG. 5A as one side of the original sheet area. When only one edge is detected on the side part where the connected edge pair is not detected, the scanner 100 determines the only one edge as the side of the original sheet area. When there are multiple edges on the side part where the connected edge pair is not detected, the scanner determines the outermost edge as the side of the original sheet area. It is note that the term "outermost" here means a position closer to the leading end in the leading end side part, or a portion closer to the trailing end in the trailing end side part. In the example shown in FIG. 6, the scanner 100 selects the edge 551, which is closer to the leading end, from among the edges 551 and 552 as the side of the original sheet area.

When the scanner 100 has detected the connected edge pair in the leading end side part or the trailing end side part, the scanner 100 obtains the inner edge, in the up-down direction in FIGS. 5A and 5B, of the connected edge pair as the opposite side of the original sheet area. It is noted that the term "inner" here means closer to the training end in the leading end side part, and a side closer to the leading end in the trailing end side part. The scanner 100 selects the edge 554, which is closer to the leading end, as the opposite side, from the edges 553 and 554. It is noted that the common end 56 of the edges 553 and 554 corresponds to a corner of a folded line of the original sheet.

Then, the scanner 100 determines an area surrounded by the one side and the opposite side in the first image data 51A, and line segments connecting the respective ends of the one side and the opposite side as the original sheet area, and extracts image data within the determined area by trimming the remainder. Specifically, the scanner 100 determines an area which is defined by sequentially connecting four points of the both ends of the edges 551 and 554 as the original sheet area. Further, the scanner 100 extracts an image portion corresponding to the image 52A by trimming the outside of the thus determined original sheet area. As a result, as shown in FIG. 7, the scanner 100 obtains an image 58A which corresponds to a portion on a left side (i.e., a portion A in FIGS. 4 and 5A) with respect to a fold line 501 of the original sheet 50 shown in FIG. 4.

For the second image data 51B, the scanner 100 determines the original sheet area in a similar manner. Then, as shown in FIG. 8, the scanner 100 detects multiple edges from the second image data 51B. In this example, the scanner 100 detects leading end side edges 555 and 556, and trailing end side edges 557 and 558. As shown in FIG. 8, the edge 555 and the edge 556 have a common end 57. Since the scanner 100 detects the two edges 555 and 556 as the connected edge pair, the scanner 100 determines the inner edge 556 as one side of the original sheet area. Further, the scanner 100 determines that an outer edge 557 in the trailing end side part as an opposite side of the original sheet area.

Then, the scanner 100 determines an area surrounded by the one and opposite sides obtained as above, and line segments respectively connecting the both ends of the one and opposite sides as the original sheet area. The scanner 100 extracts the thus determined original sheet area by trimming portions outside the original sheet area. In other words, the scanner 100 determines a rectangular area defined by connecting four points, which are both ends of the edges of 556 and 557, sequentially as the original sheet area. Further, by trimming the outside portion of the thus determined original sheet area, the scanner 100 extracts only a portion corresponding to the image 52B. With the above process, the scanner 100 obtains an image corresponding to the portion B on the right side (i.e., a portion B in FIGS. 4 and 5B) with respect to the fold line 501 of the original sheet 50 shown in FIG. 4.

Hereinafter, regarding the twofold original sheet scanning process, three different methods according to the illustrative embodiment will be described. It is noted that, according to the illustrative embodiment, the scanner 100 has a program to execute at least one of the three methods, and one of the three method is executed when the twofold original sheet is scanned. The twofold original sheet scanning process is executed by the CPU 31 in response to receipt of a command to start scanning of the twofold original sheet.

According to the illustrative embodiment, the scanner 100 receives the scan start command of the twofold original sheet through the operation panel 40 or the communication I/F 38. The scan start command of the twofold original sheet includes a selection of both-side scanning or one-side scanning. Further, when the scan start command includes the both-side scanning command, a further selection whether one piece of image data is to be generated by combining two images of both sides, or two pieces of image data respectively representing the both sides is included should be included.

According to the first method, the leading side edges and the trailing side edges are detected from the scanning image data, and the original sheet area is determined referring to all the detected edges. According to the second method, the original sheet area is determined on assumption that a half of the original surface arranged on the roller 622 side (i.e., the front surface of the original sheet) precedes the other half (i.e., the reverse surface) when the twofold original sheet is conveyed. According to the third method, edges on one end side (e.g., the leading end side) are detected, which surface (i.e., which of a half of the original surface arranged on the roller 622 side or a half of the original surface arranged on the roller 621 side) is preceding is determined based on the detected edges, and the original sheet area is determined based on which half of the original surface (i.e., which of the front surface or reverse surface) precedes the other half.

FIG. 9 shows a flowchart illustrating the twofold sheet scanning process according to the first method (hereinafter, an employed method is indicated by a parenthesized number—(1) which represents the first method). When the twofold sheet scanning process (1) is started, the scanner 100 starts conveying the original sheet, and also starts scanning (S101). It is noted that S101 is an example of a scanning process set forth in claims. In S101, the scanner 100 conveys the original sheet in the non-separation mode, and obtains image data on line basis. It is noted that when the scanner 100 receives the both-side scanning command, the scanner 100 causes both the image sensors 21 and 22 to scan respective side parts of the original sheet, and applies the twofold sheet scanning process (1) to the image data of each surface. When the scanner 100 receives the one-side scanning command, the scanner 100 causes only the image sensor 21 to scan the original sheet.

Then, the scanner 100 detects the edges in the leading end side part and the trailing end side part, using the generated image data (S102). It is noted that S102 is an example of a detecting process set forth in the claims. The scanner 100 detects the edges such that, for the edges on the leading end side part, the scanner 100 detects from the leading end toward the trailing end, and for the edges on the trailing end side part, the scanner 100 detects the edges from the trailing end toward the leading end. As described above, after the first edge is successfully detected, the scanner 100 keeps detecting edges within the particular area. When there is a second edge within the particular area, the scanner 100 detects the second edge. When the scanner 100 successfully detects the second edge, or the scanner 100 determines that there is no second edge within the particular area, the scanner 100 terminates detection of the edges.

After detection of the edges, the scanner 100 determines, in S103, whether there is a connected edge pair among the edges detected in S102. For example, in FIG. 6, there is a connected edge pair in the trailing end side part of the first image data 51A, and in FIG. 8, there is a connected edge pair on the leading end side part of the second image data 51B. As can be seen, there is no connected edge pair on the leading end side part of the first image data 51A (FIG. 6) or the trailing end side part of the second image data 51B (FIG. 8). It is noted that S103 is an example of a determining process set forth in the claims.

In the following description, an end side part (i.e., the leading end side part or the trailing end side part) where the connected edge pair does not exist will be referred to as a first side part, and an end side part where the connected edge pair exists will be referred to as a second side part. That is, in the first image data 51A (e.g., FIG. 6), the leading end side part is the first side part, while the trailing end side part is the second side part. In the second image data 51B (e.g., FIG. 8), the leading end side part is the second side part, while the trailing end side part is the first side part. It is noted that a case where the connected edge pair does not exist includes a case where there is only one edge, and a case where there are two edges which do not have a common end (i.e., are not connected).

When it is determined that the connected edge pair exists in the leading end side part or the trailing end side part (S103: YES), the scanner 100 determines that the inner edge of the connected edge pair is one side of the original sheet area. Further, the scanner 100 further determines that the outer edge in the trailing end side part or the leading end side part, where the connected edge pair does not exist, as an opposite side of the original sheet area, thereby the original sheet area is determined (S104). S104 is an example of a first side obtaining process, a second side obtaining process and a determining process set forth in the claims. Further, steps S102 to S104 are an example of an identifying process set forth in the claims.

When it is determined that there is no connected edge pair in the leading end side part or the trailing end side part (S103: NO), the scanner 100 determines the original sheet area based on the edges respectively detected in the leading end side part and the trailing end side part. For example, the scanner 100 determines the original sheet area by the outermost edge in the leading end side part and the outermost edge in the trailing end side part (S105). When the original sheet which is not subject to be scanned is not scanned (e.g., when the twofold original sheet accurately folded at the center thereof), only one edge is detected on the leading end side part and only one edge is detected on the trailing end side part. Further, when the edge has not been detected appropriately, there is a possibility that the scanner 100 may determine that there are no connected edge pairs. Therefore, according to the illustrative embodiment, when determination in S103 is NO, the scanner 100 determines the original sheet area based on the outermost one of the detected edges in order to prevent a failure to determine the original sheet area.

When it is determined that the connected edge pairs exist on both the leading end side part and the trailing end side part in S103, the scanner 100 may execute the following steps assuming that one of the end side parts is the first side part, terminate the twofold sheet scanning process as an error occurs, or may determine that an entire area of the scanned image data is the original sheet area. It is because the original sheet is generally opaque, and there is normally no connected edge pair or only one connected edge pair exists.

After the original sheet area has been determined in S104 or S105, the scanner 100 trims the image data (S107) so that an area of the image matches the determined original sheet area. S107 is an example of an extracting process set forth in the claims. Further, the scanner 100 obtains an inclination of the side of the original sheet area on the leading end (S108). S108 is an example of an inclination obtaining process set forth in the claims. Further, the scanner executes an inclination compensation (S109) of the image data, to which the trimming has been applied, based on the inclination obtained in S108. S109 is an example of a compensation process set forth in the claims.

According to the scanner 100, a possibility that the edge is exhibited clearly is higher in the leading end side part than in the trailing end side part. It is because the photoelectric elements of the image sensor 21 and 22 are arranged such that a light emitting direction includes a component of the conveying direction of the original sheet, and a shadow of the end portion of the original sheet appears clearer in the leading end side part than in the trailing end side part. Since the scanner 100 executes the inclination compensation using the inclination of the side at the leading end, the above characteristic suppresses an erroneous detection of the inclination. It is noted that, in an scanner having a different characteristic, the inclination compensation may be executed based on the inclination of the side at the trailing end, or based on a longer one of the sides at respective ends.

Then, the scanner 100 executes an outputting process in which the image data after execution of the inclination compensation is output in response to the user command (S110). Next, referring to FIG. 10, the outputting process executed in S110 of the twofold sheet scanning process (1) will be described. The outputting process is executed after obtaining a compensation image, which is a resultant image after executions of extraction of the original sheet area from the scanned image data, and the inclination compensation to the extracted image data.

In the outputting process, the scanner 100 determines whether the both-side scanning is instructed (S201). When the scanner 100 has received the command of the both-side scanning, the scanner 100 has obtained two compensated images corresponding to both sides of the twofold original sheet in the twofold sheet scanning process. When the scanner 100 has received the command of one-side scanning, the scanner 100 has obtained one compensated image corresponding to one side of the original sheet. It is noted that, when the scanner 100 has received the command of the both-side scanning and executed the twofold sheet scanning process for each surface of the twofold original sheet, the scanner 100 executes the outputting process in S110 of one of the twofold sheet scanning processes for both sides of the twofold original sheet. In the other twofold sheet scanning process, the scanner 100 skips S110.

When it is determined that the scanner 100 has not received the command of the both-side scanning (S201: NO), the scanner 100 has only obtained the compensated image for one side of the original sheet, and the scanner 100 generates the output image from the compensated image of one side of the original sheet (S202). For example, as shown in FIG. 7, the scanner 100 generates an output image 58 as indicated by broken lines in FIG. 7 based on the image 58A. The scanner 100 add an image area to the shorter side of the two sides used to determine the original sheet area so as to have the same length of the longer side, thereby an output image having a rectangular shape being generated. An image to be added to the shorter side is, for example, a white image, an image having a color which is included mostly within the original sheet area, or the like.

When it is determined that the scanner 100 has received the command of the both-side scanning (S201: YES), the scanner 100 determines whether a command of combined output which is a command to combine the images of both sides of the twofold original sheet and output a single output image has been received (S205). When it is determined that the scanner 100 has received the command of the combined output (S205: YES), the scanner 100 combines the two compensated images respectively corresponding to the both sides of the twofold original sheet by arranging such that the oblique sides of the two compensated images are aligned (S206). The oblique side is a side connecting two corners each having a non-right angle of each compensated image. S206 is an example of a both-side image combining process set forth in the claims.

That is, when the scanner 100 obtains the connected edge pair in the twofold sheet scanning process, the scanner 100 determines that a side including the common end of the connected edge pair as the oblique side. When the scanner 100 has not obtained the connected edge pair, the scanner obtains a side which does not have a right angle with respect to a longer side as the oblique side in each compensated image. Then, the scanner 100 combines the two compensated image by aligning respective oblique sides. For example, by combining the image 58A shown in FIG. 7 and the similar image of the other side, the scanner 100 can output the image which closely corresponding to the original shape of the original sheet.

When it is determined that the scanner 100 has not received the command of the combined output (S205: NO), the scanner 100 generates two output images based on two compensated images of both sides, respectively. In that case, the scanner 100 determines whether the compensated images should be complemented with use of the compensated images of the other sides, respectively (S207). It is noted that whether or not to execute the complementation may be determined in advance, or the scanner may determine to execute the complementation based on the user's command.

When the scanner 100 determines to apply the complementation (S207: YES), the scanner 100 complements the compensated image to have a rectangular shape and generates to output images (S208). In S208, the scanner 100 adjusts excess and deficiency between images 58A and 58B, generates two ideal divided images which are two rectangular output images having the same size representing respective sides. It is noted that S208 is an example of a dividing/combining process set forth in the claims.

For example, as shown in FIG. 11, the scanner 100 refers to the image 58A of one side and the image 58B of the other side, and determines dividing positions at which the images 58A and 58B are divided to make the images 58A and 58B have the same size. For example, the scanner 100 determines a position at a half of the sum of sides of both images on the leading end as the dividing position. In such a case, by combining the both images and then dividing the thus combined image at the dividing position, two divided images having the same size (i.e., ideal divided images) can be obtained.

That is, the scanner 100 cuts out a protruded portion 58Ap, which is a portion protruded from the ideal area of the divided image, from the image 58A of one side of the twofold original sheet, and add the protruded portion 58Ap to a lacking portion 58Bp, which is a portion lacking in the ideal area of the divided image, to the image 58B. Similarly, the scanner 100 cuts out a protruded portion 58Bp, which is a portion protruded from the ideal area of the divided image, from the image 58A of the other side of the twofold original sheet, and add the protruded portion 58Bq to a lacking portion 58Aq, which is a portion lacking in the ideal area of the divided image, to the image 58A.

With the above image processing, a length of the side of the leading end of each of the two generated images becomes a half of the sum of the length of the side on the leading end of the image 58A and the length of the side on the leading end of the image 58B. That is, with the above image processing, two divided images representing accurately divided ones of the original sheet area before folded can be generated. It should be noted that the two divided images need not have the same size. For example, simply by cutting out a portion of one of the two images 58A and 58B and combining the cutout image to the other, two rectangular images can be generated.

When the scanner 100 determines not to complement (S207: NO), the scanner 100 generates two rectangular output images without complementation (S209). For example, as is done when the output image of one side is generated in S202, the scanner 100 add areas, referring to the longer sides, to the compensated images of both sides, respectively, to generate rectangular output images.

The scanner 100 transmits the output image generated in S202, S206, S208 or S209 to a destination designated in the scan command (S210), terminates the outputting process, and returns to the twofold sheet scanning process shown in FIG. 9. Since the outputting process (S110) has been finished, the scanner 100 terminates the twofold sheet scanning process.

Next, the twofold sheet scanning process (2) employing the second method will be described referring to FIG. 12. According to the twofold sheet scanning process (2), it is assumed that a surface arranged on the lower side (i.e., the roller 622 side) is conveyed earlier than the upper side (i.e., the roller 621 side) of the twofold sheet because of the arrangement of the rollers of the separation roller pair 62. That is, the scanner 100 assumes that, in the image scanned by the lower image scanner 21, the front surface precedes the reverse surface, and accordingly, the leading end side part and the trailing end side part are the first side part and the second side part, respectively. Further, the scanner 100 assumes that, in the image scanned by the upper image sensor 22, the reverse surface precedes the front surface, and accordingly, the leading end side part and the trailing end side part are the second side part and the first side part, respectively.

When the scanner 100 starts the twofold sheet scanning process (2), the scanner 100 starts conveying the original sheet and then start scanning (S101). According to the second method, as will be described later, positions at which the output of the ultrasonic sensor 81 changes are detected. Therefore, when the scanning is executed, the scanner 100 activates the ultrasonic sensor 81.

Then, the scanner 100 detects the first edge on the leading end side part and the first edge of the trailing edge based on the image data obtained by scanning (S301). Different from the first method, when the first edge is detected, the scanner 100 stop detecting an edge on the end side part. Thus, the scanner 100 detects only the leading side edge 811 and the trailing side edge 812 as shown in FIG. 13.

Next, the scanner 100 determines whether the image data currently processed is the image scanned by a separation side image sensor 22 (S303). It is noted that the separation side means a roller 621 side (i.e., the upper side). When it is determined that the image currently processed is of the separation side (S303: YES), the scanner 100 assumes that the leading end side part is the second side part, and determines the original sheet area (S304).

In S304, the scanner 100 assumes that an edge 811 on the leading end side part shown in FIG. 13 is a side of the other surface (i.e., the reverse surface) and an edge 812 on the trailing end side is the side of the front surface. Then, the scanner 100 obtains both end points 813 and 814 of the edge 812 (i.e., the edge corresponding to the side of the front surface). Further, the scanner 100 obtains the positions at which the output of the ultrasonic sensor 81 are changed to obtain the other sides of the original sheet area. That is, the scanner 100 makes use of the positions at which the outputs of the ultrasonic sensor 81 are changed.

In the example of FIG. 13, an area with oblique hatch is an area where the folded original sheet overlaps. The output of the ultrasonic sensor 81 changes at points 821 and 822. That is, the scanner 100 obtains a starting point and end point of the area where the folded original sheet overlaps. Then, the scanner 100 obtains an intersection point 831 at which a line 825 parallel with the trailing edge 812 and a line 826 passing the end point 814 and orthogonal to the edge 812 intersect.

For example, the scanner 100 obtains an inclination of a linear expression of the edge 812. Then, based on the obtained inclination and a coordinate of the point 821, the scanner 100 obtains a linear expression of the line 825. Further, based on the inclination and a coordinate of the end point 814, the scanner 100 obtains a linear expression of the line 826. Then, based on the line expressions of the line 825 and line 826, the scanner 100 obtains a coordinate of the intersection point 831.

Similarly, the scanner 100 obtains a coordinate of an intersection point 833, at which the line 825 and the edge 811 intersect. Then, the scanner determines an area defined by four points 813, 814, 831 and 833 as the original sheet area subject to scanning.

Instead of using the points 821 and 822 at which the outputs of the ultrasonic sensor 81 have changed, the scanner 100 may obtain a point 833 which is one of end points of the leading side edge 811 and closer to the trailing end. In such a case, the scanner 100 obtains the intersection point 831 as a point where a line 825 passing the point 833 and parallel with the edge 812 and the line 826 passing the end point 814 and orthogonal to the edge 812 intersect. In this way, the scanner 100 can also obtain the four points 813, 814, 831 and 833.

When it is determined that the image currently processed is not an image on the separation side (S303: NO), the scanner 100 assumes that the trailing end side part is the second side part. Then, as in S304, the scanner 100 determines the original sheet area (S305). That is, the scanner 100 assumes the leading end side part edge is one side of the original sheet area, and determines the original sheet area with use of the points at which the outputs of the ultrasonic sensor 81 have changed, or positions of the end points of the trailing end side edge.

Thereafter, the scanner 100 applies trimming to the image data so that the image matches the determined original sheet area (S107). Further, with use of the inclination of the side of the original sheet area obtained in S304 or S305, the scanner applies the inclination compensation to the image data to which the trimming has been applied (S109). It is noted that, in S109, it is preferable to apply the inclination compensation based on the inclination of the side on the leading end. Then, the scanner 100 executes the outputting process (S110) to generate the output image based on the compensated image and outputs the output image. After S110 is executed, the scanner 100 terminates the twofold sheet scanning process (2).

Next, the twofold sheet scanning process (3) employing the third method will be described referring to a flowchart shown in FIG. 14. According to the third method, the scanner 100 detects an edge in one of the end side parts (i.e., leading end side part and the trailing end side part), and determines whether the currently processed image data is of the data of a surface preceding to the other or not. In the description of the third method, steps similar to those in the first method are assigned with the same step numbers and description thereof will be omitted for brevity. It is noted that, also in the third method, the scanner 100 activates the ultrasonic sensor 81 when the scanning is executed.

When the twofold sheet scanning process (3) is started, the scanner 100 starts conveying the original sheet, and scanning of the same (S101). Then, the scanner 100 detects the edge in the leading end side part (S401). In S401, if there is a second edge, the scanner 100 detects the second edge in addition to the first edge.

For example, as shown in FIG. 15, the scanner 100 obtains positions at which the output of the sheet sensor 72 has changed. In this example, the output of the sheet sensor 72 changes from absent to present at point 841, and present to absent at point 842. That is, the scanner 100 obtains a start point and an end point of an area including at least one original sheet based on the output of the sheet sensor 72. Further, similarly to the example shown in FIG. 13, the scanner 100 obtains a start point 821 and an end point 822 of an area where the folded original sheet overlaps based on the output of the ultrasonic sensor 81.

In S403, the scanner 100 determine whether a connected edge pair is detected in the leading end side part. When it is determined that there is a connected edge pair (i.e., two edges 851 and 852 having a common end) as shown in FIG. 15 (S403: YES), the scanner 100 obtains positions of the both end points 853 and 854 assuming that the inner edge 852 is a side of the original sheet area. Further, the scanner 100 determines the original sheet area (S404) with use of a position of the point 842 at which the output of the sheet sensor 72 has changed.

In S404, the scanner 100 obtains a position of an intersection point 861 at which a line 855 passing the point 842 and parallel with the edge 852 and a line 856 passing an end point 854 of the edge 852 and closer to the trailing end and orthogonal to the edge 852 intersect. Further, the scanner 100 obtains a position of an intersection point 862 at which a line 857 passing the point 822 and parallel with the outer edge 851 and the line 855 intersect. Further, the scanner 100 determines an area defined by the four points 853, 854, 861 and 862 as the original sheet area subject to scanning.

For example, the scanner 100 obtains inclinations of linear expressions of the edges 851 and 852, respectively. Then, based on the inclination of the edge 852 and the coordinate of the point 842, the scanner 100 obtains a linear expression of the line 855. Further, the scanner 100 obtains a linear expression of the line 856 based on the inclination of the edge 852 and a coordinate of the end point 854. Furthermore, the scanner obtains a coordinate of the intersection point 861 based on the linear expressions of the lines 855 and 856. Still further, the scanner 100 obtains a linear expression of the line 857 based on the inclination of the edge 851 and a coordinate of the point 822. Then, the scanner 100 obtains a coordinate of the intersection point 862 based on the expressions of the lines 855 and 857.

When it is determined that the connected edge pair does not exist in the leading end side part (S403: NO), the scanner 100 assumes that one edge obtained in S401 as a side of the original sheet area. Further, the scanner 100 determines the original sheet area with use of the position of the point 822 where the output of the ultrasonic sensor 81 has changed (S405). For example, as in the second method, the scanner 100 may obtain the positions of four points defining the original sheet area by detecting the edge in the trailing end side part.

Then, the scanner 100 trims the image data so that the image matches the determined original sheet area (S107). Further, the scanner 100 applies the inclination compensation to the image data to which the trimming has been applied with use of the inclination of the side of the original sheet area obtained in S404 or S405 (S109). It is preferable that the inclination compensation is applied based on the inclination of the side on the leading end. Thereafter, the scanner 100 executes the outputting process (S110) to generate the output image from the compensated image and output the thus generated output image. After execution of the outputting process, the scanner 100 terminates the twofold sheet scanning process (3).

As described above, the scanner 100 according to the disclosures is configured to detect multiple edges from the image data which is obtained by scanning the twofold original sheet, and identify the area of the image on the surface subject to scanning based on the detected edges. That is, the scanner 100 determines the edges, from among multiple edges, corresponding to sides defining the area of the image of the original sheet based on the determination whether the connected edge pair exists in the leading end side part or the trailing end side part. Then, based on the determined edges, the scanner 100 determines the original sheet area which is the area of the image of the original sheet. Thus, from the image data obtained by scanning twofold original sheet, the area of the original sheet subject to scanning is appropriately determined, and the image on the original sheet can be obtained precisely.

It is noted that the above-described scanner 100 is only an example, and is not intended to limit the aspects of the disclosures. Accordingly, the disclosed technique can be modified in various ways without departing from the scope of the disclosures. For example, the disclosed technique can be applied not only to a scanner, but to various types of device which has an image scanning function such as a copier, a multi-function peripheral, a facsimile machine and the like.

The scanner of the illustrative embodiment is configured such that the original sheet is conveyed when scanned. It is noted that the aspects of the disclosure need not be limited to such a type of device, and the disclosed technique can also be applied to a device in which an image sensor is moved to scan an original sheet which stayed in one place. The technique according to the disclosure can be applied to a device configured to scan a monochromatic image as well as a color image. Further, the technique according to the disclosures can be applied to a device configured to scan only one side of an original sheet as well as a both-side scanning device.

Further, the technique according to the disclosures can be applied to an image processing executed in a processing device such as a PC (personal computer). For example, a processing device capable of data communication with a scanning device such as a scanner may receive image data generated by the scanning device by scanning an twofold original sheet and generate an output image based on the received image data using the technique according to the disclosures.

It is noted that which of the three methods is executed may be determined in advance. Alternatively, one of the three methods to be executed may be determined based on a result of edge detection. For example, the first method is used when multiple edges are detected both in the leading end side part and the trailing end side part, and the second or third method may be used when no edges are detected on the trailing end side part.

According to the illustrative embodiment, a twofold A3 size original sheet is used. It is noted that the size of the original sheet need not be limited to this size of shape. Further, the size of the original sheet could be smaller or larger than A3 size. Further, the aspect ratio of the original sheet need not be limited. That is, a rectangular original sheet having any aspect ratio and folded in half can be scanned.

It is noted that the process according to the illustrative embodiment can be executed by a single CPU (central processing unit), multiple CPUs, hardware such as ASIC (application specific integrated circuit), or a combination of the same. Further, the process according to the disclosures may be realized in various aspects such as a computer-readable medium storing programs which cause a computer to executed the process, method or the like.

It is noted that various connections are set forth between elements in the description. It is noted that the connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

What is claimed is:

1. A scanner, comprising:
a scanning device configured to scan an image on an original sheet; and
a controller,
wherein the controller, when executing instructions, is configured to execute:

a scanning process in which the controller causes the scanning device to scan an original sheet to generate image data, an image on the original sheet being subject to scanning;

an identifying process in which the an original sheet area defining an area of an image of the front surface of the original sheet from an image represented by the image data obtained in the scanning process, the identifying process including:

a first side obtaining process in which the controller obtains a first side of the original sheet area within a first end side part which is one of a leading end side part and a trailing end side part of the image, the first end side part being a part where two edges having a common end do not exist, the controller obtaining an outer side edge in the first end side part as the first side;

a second side obtaining process in which the controller obtains a second side of the original sheet area within a second side part which is the other of a leading end side part and a trailing end side part of the image, the second end side part being a part where a pair of edges having a common end exists, the controller obtaining one of the pair of edges closer to the first end side part as the second side; and a determining process in which the controller determines the original sheet area based on the first side and the second side; and an extraction process in which the controller extracts an image within the original sheet area from an image represented by the image data obtained in the scanning process.

2. The scanner according to claim 1, wherein the controller is configured to further executes:

a detecting process in which the controller detects an edge in one end side part of the leading end side part and trailing end side part; and a determining process in which:

when the edges detected in the detecting process includes a pair of edges having a common end in the one end side part, the controller determines the one end side part as the second side part; and when the edges detected in the detecting process do not include the pair of edges having a common end, the controller determines the one end side part as the first side.

3. The scanner according to claim 2, wherein the controller executes the identifying process when one of the leading end side part and the trailing end side part is determined as the second side in the determining process, and wherein, when the controller determines that both the leading end side part and the trailing end side part as the first sides, the controller determines the original sheet area with use of the edge detected in the leading end side part and the edge detected in the trailing end side part.

4. The scanner according to claim 1, further comprising:

a sheet tray configured to accommodate one or multiple original sheets to be scanned by the scanning device; and a conveying device configured to convey the original sheets from the sheet tray inside the scanner, the conveying device comprising:

a feeder arranged on a first side of the original sheet conveyed from the sheet tray into the scanner and configured to introduce the original sheet from the sheet tray into the scanner; and a separator arranged on a second side of the original sheet conveyed from the sheet tray into the scanner and configured to separate one original sheet from the multiple original sheet, wherein the controller is configured such that:

when the scanned surface is the first surface, the controller determines that the leading end of the image is in the first side part and the trailing end of the image is in the second side part; and when the scanned surface is the second surface, the controller determines that the leading end of the image is in the second side part and the trailing end of the image is in the first side part.

5. The scanner according to claim 4, further comprising an overlapped feeding detector arranged between the sheet tray and the scanning device and configured to detect overlapped feeding representing the original sheets being fed in an overlapped state, wherein the controller is configured to normally determine that an error occurs when the overlapped feeding detector detects the overlapped feeding, the controller not determining that an error occurs when the overlapped feeding detector detects the overlapped feeding on condition that a particular setting having been made.

6. The scanner according to claim 4, further comprising an overlapped feeding sensor arranged on downstream with respect to the conveying device and on upstream with respect to the scanning device and configured to output different signal when a single original sheet is conveyed and the original sheets are conveyed in an overlapped manner, and the controller is configured to:

detect edges in the first side part in the image represented by the image data scanned in the scanning process and obtain the first side of the original sheet area in the first side obtaining process, and obtain the second side based on positions at which the outputs of the overlapped feeding sensor have changed and an inclination of the first side, in the second side obtaining process.

7. The scanner according to claim 4, wherein the controller is configured to:

obtain the first side by detecting an edge in the first side part from the image represented by the image data scanned in the scanning process in the first side obtaining process; and detect a position of a corner of a folded portion on the second part side from the image represented by the image data scanned in the scanning process, and detect the second side based on the position of the corner and the inclination of the first side.

8. The scanner according to claim 1, further comprising:

a sheet tray configured to accommodate on or multiple original sheets to be scanned by the scanning device;

a conveying device configured to convey the original sheets accommodated in the sheet tray inside the scanner;

a sheet sensor arranged on downstream with respect to the conveying device and on upstream with respect to the scanning device and configured to output a signal indicating presence of the original sheet and a signal indicating absence of the original sheet depending on presence and absence of the original sheet, respectively; and an overlapped feeding sensor arranged on downstream with respect to the conveying device and on upstream with respect to the scanning device and configured to output different signal when a single original sheet is conveyed and the original sheets are conveyed in an overlapped manner, wherein the scanning device scans the original sheet conveyed by the conveying device;

wherein the controller is configured to execute a detecting process in which the controller detects edges in one of the leading end side part and the trailing end side part of the image represented by the image data scanned by the scanning process; and a determining process in which:
when the edges detected in the detecting process includes a pair of edges having a common end in the one end side part, the controller determines the one end side part as the second side part; and
when the edges detected in the detecting process do not include the pair of edges having a common end, the controller determines the one end side part as the first side;

wherein, in the identifying process:
when the one of the leading end side part and the trailing end side part is determined in the determining process to be the first side part,
the controller is configured to obtain the edge detected in the detecting process as the first side, in the first side obtaining process; and
the controller is configured to obtain the second side based on the positions at which the output of the overlapped feeding sensor have changed and the inclination of the first side, in the second side obtaining process:
when the one of the leading end side part and the trailing end side part is determined in the determining process to be the second side part,
the controller is configured to obtain inner one of the edges detected in the detecting process as the second side, in the second side obtaining process; and
the controller is configured to obtain the first side based on the positions at which the output of the sheet sensor have changed and the inclination of the second side, in the first side obtaining process.

9. The scanner according to claim 1, wherein the controller determines the original sheet area based on a longer one of the first side and the second side.

10. The scanner according to claim 1,
wherein the scanning device includes:
a first scanning unit configured to scan one side of the original sheet; and
a second scanning unit configured to scan the other side of the original sheet,
wherein the controller is configured to:
cause, in the scanning process, the first scanning unit and the second scanning unit to scan both sides of the original sheet;
determine, in the identifying process, an original sheet area for the first surface of the original sheet and another original sheet area for the second surface of the original sheet; and remove a partial area of one of the original sheet area for the first surface and the original sheet area for the second surface having a non-right angle corner and having a longer one of the first side and the second side, and combine the removed partial area to the outer side having the non-right angle corner of the other of the original sheet area for the first surface and the original sheet area of the second surface having a shorter one of the first side and the second side.

11. The scanner according to claim 1,
wherein the scanning device comprising:
a first scanning unit configured to scan one side of the original sheet; and
a second scanning unit configured to scan the other side of the original sheet,
wherein the controller is configured to:
cause, in the scanning process, the first scanning unit and the second scanning unit to scan both sides of the original sheet, respectively,
determine, in the identifying process, an original sheet area for the first surface of the original sheet and another original sheet area for the second surface of the original sheet, and
combine the original sheet area of the first surface and the original sheet area of the second surface at a line segment of the original sheet area of the first surface connecting two corners respectively having non-right angles and a line segment of the original sheet area of the second surface connecting two corner respectively having non-right angles to obtain a one entire original sheet area.

12. The scanner according to claim 1,
wherein the controller is further configured to execute:
an inclination obtaining process in which the controller obtains an inclination of at least one of the first side and the second side; and
a compensation process in which the controller applies an inclination compensation to the original image based on the inclination obtained in the inclination obtaining process.

13. The scanner according to claim 12, wherein the controller obtains the inclination of one of the first side and second side arranged on the leading end side of the image.

14. A scanning method employed in a scanner, comprising:
scanning an original sheet to generate image data, an image on the original sheet being subject to scanning;
identifying an original sheet area defining an area of an image of the front surface of the original sheet within an image represented by the image data obtained in the step of scanning, and including:
obtaining a first side of the original sheet area within a first end side part which is one of a leading end side part and a trailing end side part of the image, the first end side part being a part where two edges having a common end do not exist, an outer side edge in the first end side part being obtained as the first side;
obtaining a second side of the original sheet area within a second side part which is the other of a leading end side part and a trailing end side part of the image, the second end side part being a part where a pair of edges having a common end exists, one of the pair of edges closer to the first end side part being obtained as the second side; and determining the original sheet area based on the first side and the second side; and
extracting an image within the original sheet area from an image represented by the image data obtained in the step of scanning.

15. A non-transitory computer-readable medium for a scanner having a scanning device configured to scan an image on an original sheet and a controller, wherein the computer-readable medium storing instructions which, when executed by the controller, cause the scanner to execute:

a scanning process in which the controller causes the scanning device to scan an original sheet to generate image data, an image on the original sheet being subject to scanning;

an identifying process in which the an original sheet area defining an area of an image of the front surface of the original sheet from an image represented by the image data obtained in the scanning process, the identifying process including:

a first side obtaining process in which the controller obtains a first side of the original sheet area within a first end side part which is one of a leading end side part and a trailing end side part of the image, the first end side part being a part where two edges having a common end do not exist, the controller obtaining an outer side edge in the first end side part as the first side;

a second side obtaining process in which the controller obtains a second side of the original sheet area within a second side part which is the other of a leading end side part and a trailing end side part of the image, the second end side part being a part where a pair of edges having a common end exists, the controller obtaining one of the pair of edges closer to the first end side part as the second side; and a determining process in which the controller determines the original sheet area based on the first side and the second side; and an extraction process in which the controller extracts an image within the original sheet area from an image represented by the image data obtained in the scanning process.

* * * * *